(12) United States Patent
Cha et al.

(10) Patent No.: US 11,983,368 B2
(45) Date of Patent: May 14, 2024

(54) TOUCH DISPLAY DEVICE AND DISPLAY PANEL

(71) Applicant: LG Display Co., Ltd., Seoul (KR)

(72) Inventors: Dongjoong Cha, Gyeonggi-do (KR); MinSeob Song, Jeonju-si (KR); TaeYeon Yoo, Gyeonggi-do (KR); Wonchang Do, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/089,450

(22) Filed: Dec. 27, 2022

(65) Prior Publication Data

US 2023/0205375 A1 Jun. 29, 2023

(30) Foreign Application Priority Data

Dec. 29, 2021 (KR) ........................ 10-2021-0191858

(51) Int. Cl.
*G06F 3/044* (2006.01)

(52) U.S. Cl.
CPC .......... *G06F 3/0445* (2019.05); *G06F 3/0446* (2019.05); *G06F 2203/04112* (2013.01)

(58) Field of Classification Search
CPC .. G06F 3/0412; G06F 3/0443; G06F 3/04164; G06F 3/0445; G06F 3/0448; G06F 3/0446; G06F 2203/04111; G06F 2203/04103; G06F 2203/04112

See application file for complete search history.

(56) References Cited

U.S. PATENT DOCUMENTS

| | | | |
|---|---|---|---|
| 10,658,434 B2 | 5/2020 | Song et al. | |
| 10,840,311 B2 | 11/2020 | Yun et al. | |
| 10,928,964 B2 | 2/2021 | Kim et al. | |
| 2022/0291783 A1* | 9/2022 | Kim | G06F 3/0446 |

* cited by examiner

*Primary Examiner* — Deeprose Subedi

(74) *Attorney, Agent, or Firm* — Seed IP Law Group LLP

(57) ABSTRACT

A display panel and a touch display device are disclosed. The display panel includes a first touch electrode positioned in the first area, a second touch electrode positioned in the second area, a third touch electrode positioned in the third area, a fourth touch electrode positioned in the fourth area, and a first connection pattern electrically connecting the first touch electrode and the second touch electrode. A connection portion between the third touch electrode and the fourth touch electrode may pass through an intermediate area between the first area and the second area. The first connection pattern may pass through the intermediate area between the first area and the second area and may cross the connection portion between the third and fourth touch electrodes. Each of the first, second, third and fourth touch electrodes may include a first metal layer and a second metal layer, the first metal layer and the second metal layer may be separated by a touch-interlayer insulating layer. The first connection pattern may be disposed on one of the first metal layer and the second metal layer. The first connection pattern may be located in one of the first metal layer and the second metal layer.

21 Claims, 12 Drawing Sheets

TOUCH DISPLAY DEVICE AND DISPLAY PANEL

CROSS-REFERENCE TO RELATED APPLICATIONS

This application claims the benefit and priority from Korean Patent Application No. 10-2021-0191858, filed in the Republic of Korea on Dec. 29, 2021, the entire contents of which are hereby incorporated by reference for all purposes as if fully set forth into the present application.

BACKGROUND

Technical Field

Embodiments of the present disclosure relate to a touch display device and a display panel.

Description of the Related Art

Nowadays, among display devices, there is a touch display device that provides a touch-based input method that allows a user to easily, intuitively and conveniently input information or commands by breaking away from a conventional input method such as a button, a keyboard, and a mouse.

In order to provide a touch-based input function, the touch display device must include a touch sensor structure and a touch circuit for sensing a touch. The touch sensor structure of the touch display device may include a plurality of touch electrodes corresponding to a plurality of touch sensors and a plurality of touch lines for electrical connection between the plurality of touch electrodes and the touch circuit. The touch circuit (also called touch sensing circuit) should perform a touch sensing operation suitable for the touch sensor structure. Meanwhile, touch sensitivity may vary greatly depending on electrical characteristics or electrical conditions of touch electrodes serving as touch sensors in the touch display device.

BRIEF SUMMARY

An aspect of the embodiments of the present disclosure is to provide a touch display device and a display panel having a resistance reduction type touch sensor structure with high touch sensitivity and small resistance.

Another aspect of the embodiments of the present disclosure is to provide a touch display device and display panel having a resistance reduction type touch sensor structure capable of reducing the resistance of touch electrodes by utilizing existing metal layers without adding a new metal layer in the display panel.

A touch display device of embodiments of the present disclosure may include a substrate, a first touch electrode line on the substrate, and a second touch electrode line crossing the first touch electrode line on the substrate.

In the touch display device of the embodiments of the present disclosure, the first touch electrode line may include a first touch electrode, a second touch electrode, and a first connection pattern electrically connecting the first touch electrode and the second touch electrode. The second touch electrode line may include a third touch electrode and a fourth touch electrode, and the third touch electrode and the fourth touch electrode may be integrally formed.

In the touch display device of embodiments of the present disclosure, a portion where the third touch electrode and the fourth touch electrode are connected may overlap the first connection pattern.

The touch display device of embodiments of the present disclosure may include a touch sensor metal layer and a bridge metal layer, and may further include a touch-interlayer insulating layer disposed between the touch sensor metal layer and the bridge metal layer.

In the touch display device of embodiments of the present disclosure, the first touch electrode includes a first touch sensor metal electrode in the touch sensor metal layer and a first bridge metal electrode in the bridge metal layer. The second touch electrode includes a second touch sensor metal electrode in the touch sensor metal layer and a second bridge metal electrode in the bridge metal layer. The third touch electrode includes a third touch sensor metal electrode in the touch sensor metal layer and a third bridge metal electrode in the bridge metal layer. The fourth touch electrode includes a fourth touch sensor metal electrode in the touch sensor metal layer and a fourth bridge metal electrode in the bridge metal layer.

In the touch display device of embodiments of the present disclosure, the first connection pattern includes a first bridge metal connection pattern of the bridge metal layer in which the first, second, third and fourth bridge metal electrodes of the first, second, third and fourth touch electrodes are disposed.

The touch display device of embodiments of the present disclosure comprises a first touch electrode positioned in a first area, a second touch electrode positioned in a second area, a third touch electrode positioned in a third area, a fourth touch electrode positioned in a fourth area, and a first connection pattern electrically connecting the first touch electrode and the second touch electrode.

In the touch display device of embodiments of the present disclosure, a connection portion between the third touch electrode and the fourth touch electrode passes through an intermediate area between the first area and the second area. The first connection pattern passes through the intermediate area between the first area and the second area and crosses the connection portion between the third touch electrode and the fourth touch electrode.

In the touch display device of embodiments of the present disclosure, each of the first, second, third and fourth touch electrodes includes a first metal layer and a second metal layer, and the first metal layer and the second metal layer are separated by a touch-interlayer insulating layer.

In the touch display device of embodiments of the present disclosure, the first connection pattern is disposed on one of the first metal layer and the second metal layer.

The display panel of embodiments of the present disclosure comprises a substrate, a first touch electrode line on the substrate, and a second touch electrode line crossing the first touch electrode line on the substrate.

In the display panel of embodiments of the present disclosure, the first touch electrode line includes a first touch electrode, a second touch electrode, and a first connection pattern electrically connecting the first touch electrode and the second touch electrode.

In the display panel of embodiments of the present disclosure, the second touch electrode line includes a third touch electrode and a fourth touch electrode. The third touch electrode and the fourth touch electrode are integrally formed.

In the display panel of embodiments of the present disclosure, a portion where the third touch electrode and the fourth touch electrode are connected overlaps the first connection pattern. That the connection portion between the third touch electrode and the fourth touch electrode overlaps with the first connection pattern may mean that the connection portion between the third touch electrode and the fourth touch electrode is electrically separated from and crosses the first connection pattern.

The display panel of embodiments of the present disclosure may include a touch sensor metal layer and a bridge metal layer, and may further include a touch-interlayer insulating layer disposed between the touch sensor metal layer and the bridge metal layer.

In the display panel of embodiments of the present disclosure, the first touch electrode includes a first touch sensor metal electrode in the touch sensor metal layer and a first bridge metal electrode in the bridge metal layer. The second touch electrode includes a second touch sensor metal electrode in the touch sensor metal layer and a second bridge metal electrode in the bridge metal layer. The third touch electrode includes a third touch sensor metal electrode in the touch sensor metal layer and a third bridge metal electrode in the bridge metal layer. The fourth touch electrode includes a fourth touch sensor metal electrode in the touch sensor metal layer and a fourth bridge metal electrode in the bridge metal layer.

In the display panel of embodiments of the present disclosure, the first connection pattern includes a first bridge metal connection pattern of the bridge metal layer in which the first, second, third and fourth bridge metal electrodes of the first, second, third and fourth touch electrodes are disposed.

According to embodiments of the present disclosure, it is possible to provide a touch display device and a display panel having a resistance reduction type touch sensor structure that can provide high touch sensitivity and reduce the resistance of the touch electrode without increasing the thickness of the touch sensor as compared to the conventional one.

According to embodiments of the present disclosure, it is possible to provide a touch display device and a display panel having a resistance reduction type touch sensor structure capable of reducing the resistance of a touch electrode by using the existing metal layers without adding a new metal layer in the display panel.

BRIEF DESCRIPTION OF THE SEVERAL VIEWS OF THE DRAWINGS

The above and other embodiments, features and advantages of the present disclosure will be more apparent from the following detailed description taken in conjunction with the accompanying drawings, in which.

DETAILED DESCRIPTION

Figure 1:
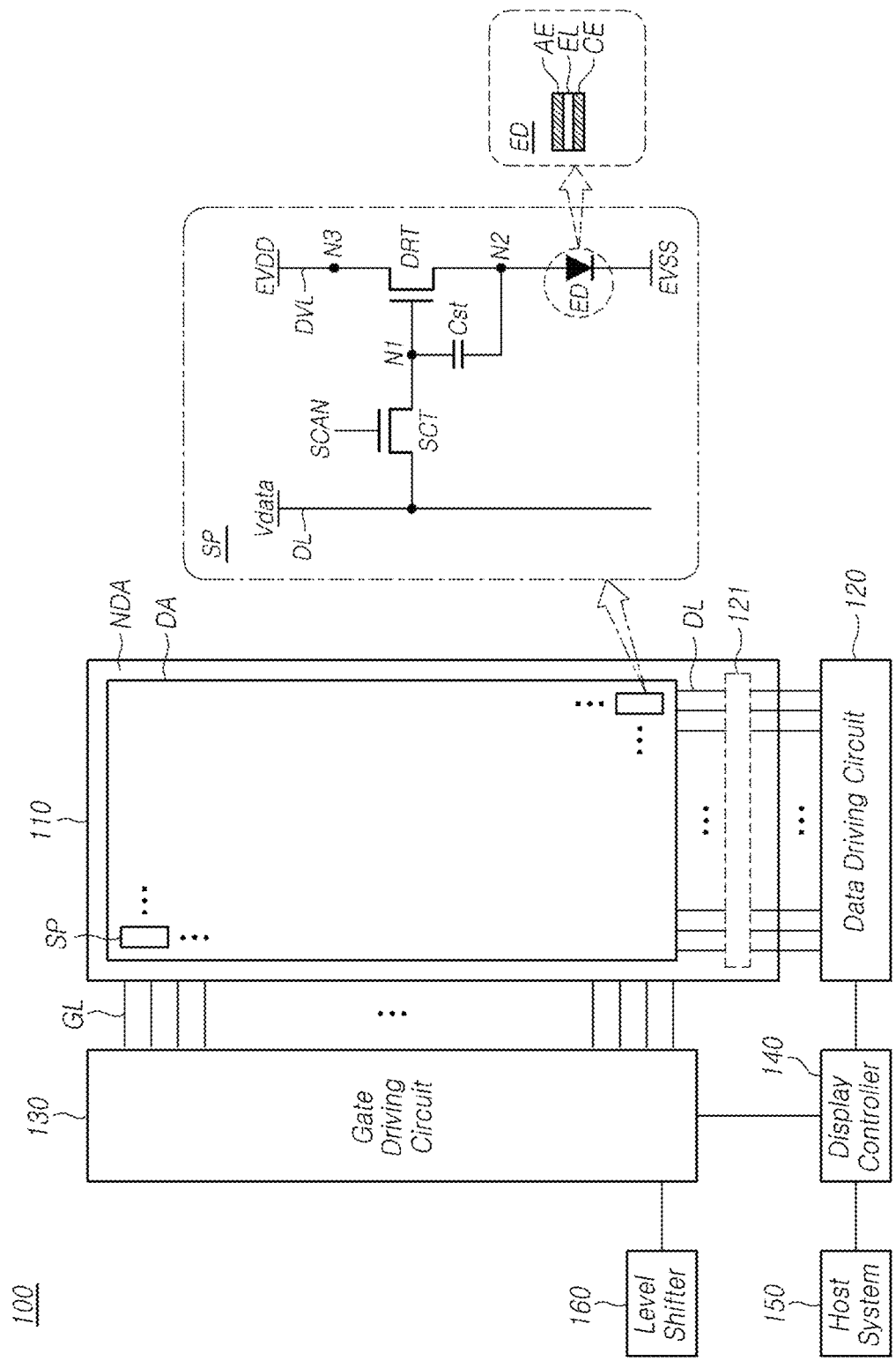
FIG. 1 is a diagram illustrating a display driving system of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to the accompanying drawings.

FIG. 1 is a diagram illustrating a display driving system of a touch display device 100 according to embodiments of the present disclosure.

Referring to FIG. 1, the display driving system of the touch display device 100 according to embodiments of the present disclosure may include a display panel 110 and a display driving circuit for driving the display panel 110.

The display panel 110 may include a display area DA in which an image is displayed and a non-display area NDA in which an image is not displayed.

The display panel 110 may include a plurality of sub-pixels SP for image display. For example, the plurality of sub-pixels SP may be disposed in the display area DA. In some cases, at least one sub-pixel SP may be disposed in the non-display area NDA. The at least one sub-pixel SP disposed in the non-display area NDA is also referred to as a dummy sub-pixel.

The display panel 110 may include a plurality of signal lines for driving the plurality of sub-pixels SP. For example, the plurality of signal lines may include a plurality of data lines DL and a plurality of gate lines GL. The plurality of signal lines may further include other signal lines according to the structure of the sub-pixel SP. For example, the other signal lines may include driving voltage lines DVL.

The plurality of data lines DL and the plurality of gate lines GL may cross each other. Each of the plurality of data lines DL may be disposed to extend in a first direction. Each of the plurality of gate lines GL may be disposed to extend in a second direction. Here, the first direction may be a column direction and the second direction may be a row direction. In this specification, a column direction and a row direction are relative. For example, the column direction may be a vertical direction and the row direction may be a horizontal direction. As another example, the column direction may be a horizontal direction and the row direction may be a vertical direction.

The display driving circuit may include a data driving circuit 120 for driving the plurality of data lines DL and a gate driving circuit 130 for driving the plurality of gate lines GL. The display driving circuit may further include a display controller 140 for controlling the data driving circuit 120 and the gate driving circuit 130.

The data driving circuit 120 is a circuit for driving the plurality of data lines DL, and may output data voltages (also referred to as data signals) corresponding to an image signal to the plurality of data lines DL. A data pad unit or structure or region 121 may be disposed in the non-display area NDA of the display panel 110. The data pad unit 121 may include a plurality of data pads to which the plurality of data lines DL are electrically connected and to which the data driving circuit 120 is electrically connected.

The gate driving circuit 130 is a circuit for driving the plurality of gate lines GL, and may generate gate signals and output the gate signals to the plurality of gate lines GL.

The display driving circuit may further include a level shifter 160 that supplies gate clock signals to the gate driving circuit 130. The gate driving circuit 130 may generate gate signals based on the gate clock signals transmitted from the level shifter 160, and output the generated gate signals to the gate lines GL according to a predetermined or selected gate driving timing.

The display controller 140 may control scanning according to timing implemented in each frame, and may control data drive at an appropriate time according to the scanning timing. The display controller 140 may convert input image data input from the host system 150 to match the data signal format used by the data driving circuit 120 and supply the converted image data into the data driving circuit 120.

The display controller 140 may receive display driving control signals from the external host system 150 together with the input image data. For example, the display driving control signals may include a vertical synchronization signal (VSYNC), a horizontal synchronization signal (HSYNC), an input data enable signal (DE), a clock signal, and the like.

The display controller 140 may generate data driving control signals and gate driving control signals based on display driving control signals (e.g., VSYNC, HSYNC, DE, clock signal, etc.) input from the host system 150. Here, the data driving control signals and the gate driving control signals may be control signals included in the display driving control signals.

The display controller 140 may control a driving operation and a driving timing of the data driving circuit 120 by supplying data driving control signals to the data driving circuit 120. For example, the data driving control signals may include a source start pulse (SSP), a source sampling clock (SSC), a source output enable signal (SOE), and the like.

The display controller 140 may control a driving operation and a driving timing of the gate driving circuit 130 by supplying gate driving control signals to the gate driving circuit 130. For example, the gate driving control signals may include a gate start pulse (GSP), a gate shift clock (GSC), a gate output enable signal (GOE), and the like.

The data driving circuit 120 may include one or more source driver integrated circuits (SDICs). Each source driver integrated circuit SDIC may include a shift register, a latch circuit, a digital to analog converter (DAC), an output buffer, and the like. The data driving circuit 120 may include a shift register, a latch circuit, a digital to analog converter (DAC), an output buffer, and the like. In some cases, the data driving circuit 120 may further include an analog to digital converter (ADC).

For example, each of the source driver integrated circuits (SDICs) may be connected to the display panel 110 in a tape automated bonding (TAB) method, a chip-on-glass (COG) method, or a chip-on-panel (COP) method. Alternatively, each of the source driver integrated circuits (SDICs) may be implemented in a chip-on-film (COF) method and connected to the display panel 110.

The gate driving circuit 130 may output a gate signal of a turn-on level voltage or a gate signal of a turn-off level voltage according to the control of the display controller 140. The gate driving circuit 130 may sequentially drive the plurality of gate lines GL by sequentially supplying a gate signal having a turn-on level voltage to the plurality of gate lines GL.

The gate driving circuit 130 may be connected to the display panel 110 by a tape automated bonding (TAB) method, a chip-on-glass (COG) method, or a chip-on-film (COF) method. Alternatively, the gate driving circuit 130 may be formed in the non-display area NDA of the display panel 110 in a gate in panel (GIP) type. The gate driving circuit 130 may be disposed on or connected to the substrate.

That is, in the case of the GIP type, the gate driving circuit 130 may be disposed in the non-display area NDA of the substrate.

Meanwhile, at least one of the data driving circuit 120 and the gate driving circuit 130 may be disposed in the display area DA. For example, at least one of the data driving circuit 120 and the gate driving circuit 130 may be disposed so as not to overlap the sub-pixels SP. Alternatively, at least one of the data driving circuit 120 and the gate driving circuit 130 may be disposed to partially or entirely overlap the sub-pixels SP.

When a specific gate line GL is driven by the gate driving circuit 130, the data driving circuit 120 may convert the image data received from the display controller 140 into a data voltage Vdata that is an analog voltage, and supply the data voltage Vdata to a plurality of data lines DL.

The data driving circuit 120 may be connected to one side (e.g., top or bottom) of the display panel 110. Depending on the driving method, the panel design method, etc., the data driving circuit 120 may be connected to both sides (e.g., top and bottom) of the display panel 110, or may be connected to two or more of the four sides of the display panel 110.

The gate driving circuit 130 may be connected to one side (e.g., left or right) of the display panel 110. Depending on the driving method, the panel design method, etc., the gate driving circuit 130 may be connected to both sides (e.g., left and right) of the display panel 110, or may be connected to two or more of the four sides of the display panel 110.

The display controller 140 may be implemented as a separate component from the data driving circuit 120. Alternatively, the display controller 140 may be integrated with the data driving circuit 120 to be implemented as an integrated circuit.

The display controller 140 may be a timing controller used in a conventional display technology, or a control device capable of further performing other control functions including a timing controller. The display controller 140 may be implemented with various circuits or electronic components such as an integrated circuit (IC), a field programmable gate array (FPGA), an application specific integrated circuit (ASIC), or a processor.

The display controller 140 may be mounted on a printed circuit board or a flexible printed circuit, and may be electrically connected to the data driving circuit 120 and the gate driving circuit 130 through a printed circuit board or a flexible printed circuit.

The display controller 140 may transmit and receive signals to and from the data driving circuit 120 according to one or more predetermined or selected interfaces. Here, for example, the interfaces may include at least one of a Low Voltage Differential Signaling (LVDS) interface, an Embedded Clock Point-to-Point Interface (EPI), and a Serial Peripheral Interface (SPI).

The display controller 140 may include a storage medium such as one or more registers.

The touch display device 100 according to embodiments of the present disclosure may be a self-luminous display device in which the display panel 110 emits light by itself. When the touch display device 100 according to embodiments of the present disclosure is a self-emission display device, each of the plurality of sub-pixels SP may include a light emitting device ED.

For example, the touch display device 100 according to embodiments of the present disclosure may be an organic light emitting display device in which the light emitting device ED is implemented as an organic light emitting diode (OLED). For another example, the touch display device 100 according to embodiments of the present disclosure may be an inorganic light emitting display device in which the light emitting device ED is implemented as an inorganic material-based light emitting diode. As another example, the touch display device 100 according to the embodiments of the present disclosure may be a quantum dot display device in which the light emitting device ED is implemented with quantum dots, which are semiconductor crystals that emit light by themselves.

Referring to FIG. 1, in the touch display device 100 according to embodiments of the present disclosure, each sub-pixel SP may include a light emitting device ED, a driving transistor DRT for controlling the current flowing to the light emitting device ED, a scan transistor SCT that transfers a data voltage Vdata corresponding to an image signal to the driving transistor DRT, and a storage capacitor Cst to hold voltage for a period of time.

The light emitting device ED may include an anode electrode AE and a cathode electrode CE, and a light emitting layer EL positioned between the anode electrode AE and the cathode electrode CE. For example, the light emitting device ED may be one of an organic light emitting diode (OLED), an inorganic light emitting diode, a quantum dot light emitting device, and the like.

The anode electrode AE of the light emitting device ED may be a pixel electrode disposed in each sub-pixel SP. The cathode electrode CE of the light emitting device ED may be a common electrode. In this case, a base voltage EVSS corresponding to a common voltage may be applied to the cathode electrode CE of the light emitting device ED. For example, the base voltage EVSS may be a ground voltage or a voltage similar to the ground voltage.

The driving transistor DRT is a transistor for driving the light emitting device ED, and may include a first node N1, a second node N2, a third node N3, and the like.

The first node N1 of the driving transistor DRT may be a gate node, and may be electrically connected to a source node or a drain node of the scan transistor SCT.

The second node N2 of the driving transistor DRT may be a source node or a drain node, and may be electrically connected to the anode electrode AE of the light emitting device ED.

The third node N3 of the driving transistor DRT may be a drain node or a source node. A driving voltage EVDD may be applied to the third node N3 of the driving transistor DRT. The third node N3 of the driving transistor DRT may be electrically connected to the driving voltage line DVL supplying the driving voltage EVDD.

The scan transistor SCT may control the connection between the first node N1 of the driving transistor DRT and a corresponding data line DL according to a scan signal SCAN supplied from the gate line GL.

A drain node or a source node of the scan transistor SCT may be electrically connected to a corresponding data line DL. A source node or a drain node of the scan transistor SCT may be electrically connected to the first node N1 of the driving transistor DRT. A gate node of the scan transistor SCT may be electrically connected to the gate line GL to receive the scan signal SCAN.

The scan transistor SCT may be turned on by the scan signal SCAN having a turn-on level voltage. The turned-on scan transistor SCT may transfer the data voltage Vdata supplied from the corresponding data line DL to the first node N1 of the driving transistor DRT.

The scan transistor SCT may be turned on by the scan signal SCAN of the turn-on level voltage and may be turned off by the scan signal SCAN of the turn-off level voltage.

Here, when the scan transistor SCT is an n-type transistor, the turn-on level voltage may be a high level voltage, and the turn-off level voltage may be a low level voltage. When the scan transistor SCT is a p-type transistor, the turn-on level voltage may be a low level voltage and the turn-off level voltage may be a high level voltage.

The storage capacitor Cst may be electrically connected between the first node N1 and the second node N2 of the driving transistor DRT. The storage capacitor Cst may maintain the data voltage Vdata corresponding to the image signal voltage or a voltage corresponding thereto for one frame time.

The storage capacitor Cst may be not a parasitic capacitor (e.g., Cgs, Cgd), which is an internal capacitor existing between the gate node and the source node (or drain node) of the driving transistor DRT, but an external capacitor intentionally designed outside the driving transistor DRT.

For example, each of the driving transistor DRT and the scan transistor SCT may be an n-type transistor or a p-type transistor. Both the driving transistor DRT and the scan transistor SCT may be n-type transistors or p-type transistors. At least one of the driving transistor DRT and the scan transistor SCT may be an n-type transistor (or a p-type transistor), and the other may be a p-type transistor (or an n-type transistor).

The structure of each sub-pixel SP illustrated in FIG. 1 is only an example for description. Each sub-pixel SP may include one or more transistors or may further include one or more capacitors. Alternatively, each of the plurality of sub-pixels SP may have the same structure, and some of the plurality of sub-pixels SP may have a different structure.

Figure 2:
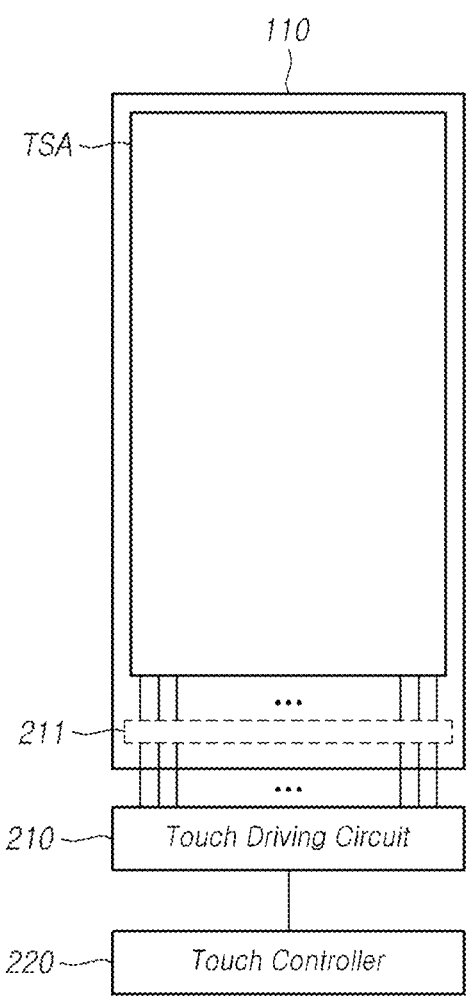
FIG. 2 is a diagram illustrating a touch sensing system of the touch display device according to embodiments of the present disclosure.

FIG. 2 is a diagram illustrating a touch sensing system of the touch display device 100 according to embodiments of the present disclosure.

Referring to FIG. 2, the touch display device 100 according to embodiments of the present disclosure may further provide a touch sensing function in addition to an image display function. In order to provide the touch sensing function, the touch display device 100 according to embodiments of the present disclosure may include a touch sensing system that senses a touch occurrence by a touch pointer or senses a touch position by the touch pointer.

For example, the touch pointer is a user's touch tool and may include a finger or a pen. When the touch pointer touches the display panel 110, the touch pointer may touch the display panel 110 in a contact manner, or the touch pointer may touch the display panel 110 in a non-contact manner. Here, the non-contact method may be a hover mode method.

The touch sensing system may include a touch sensor disposed in a touch sensing area TSA, and a touch circuit for sensing the presence of a touch and/or a touch position by driving and sensing the touch sensor.

The touch circuit may include a touch driving circuit 210 that drives and senses the touch sensor and outputs touch sensing data, and a touch controller 220 that determines a touch event or a touch location (also called touch coordinates) using the touch sensing data.

The touch sensor may be included inside the display panel 110 or included outside the display panel 110.

When the touch sensor is included in the display panel 110, the touch sensor may be formed during the manufacturing process of the display panel 110. When the touch sensor is included in the display panel 110, the touch sensor may be referred to as a built-in touch sensor. For example, the built-in touch sensor may include an in-cell type touch sensor or an on-cell type touch sensor.

When the touch sensor is included outside the display panel 110, the display panel 110 and the touch panel including the touch sensor are separately manufactured, and then the touch panel and the display panel 110 may be bonded. When the touch sensor is included outside the display panel 110, the touch sensor may be referred to as an external touch sensor. For example, the external touch sensor may include an add-on type touch sensor or the like.

Hereinafter, for convenience of description, it is assumed that the touch sensor is included in the display panel 110. However, it is not limited thereto.

The touch sensor may be disposed in the touch sensing area TSA. The location and/or size of the touch sensing area TSA may correspond to the location and/or size of the display area DA. In some cases, the location and/or size of the touch sensing area TSA may be different from the location and/or size of the display area DA.

The touch sensor may include a plurality of touch electrodes and a plurality of touch routing lines (also referred to as a plurality of touch lines). An electrical state (e.g., capacitance, etc.) of at least one of the plurality of touch electrodes may change according to whether the user touches the touch electrode. The plurality of touch routing lines may electrically connect the plurality of touch electrodes to the touch driving circuit 210. The touch driving circuit 210 may sense a change in an electrical state of a corresponding touch electrode through at least one of the plurality of touch routing lines.

When the touch sensor is included in the display panel 110, the touch pad unit or structure or region 211 may be disposed in the non-display area NDA of the display panel 110. The touch pad unit 211 may include a plurality of touch pads to which the plurality of touch routing lines are electrically connected and to which the touch driving circuit 210 is electrically connected.

The touch pad unit 211 may be disposed on the substrate of the display panel 110, and may be disposed in the non-display area NDA, which is an outer area of the display area DA.

The touch driving circuit 210 may generate touch sensing data by driving and sensing the touch sensor. The touch driving circuit 210 may supply the generated touch sensing data to the touch controller 220.

The touch controller 220 may sense touch generation or sense a touch position based on touch sensing data. The touch controller 220 or another controller interworking therewith may perform a predetermined or selected function based on the sensed touch generation or the determined touch location. For example, the predetermined or selected function may include one or more of input processing, object selection processing, handwriting processing, and the like.

The touch driving circuit 210 may be implemented as an integrated circuit separate from the data driving circuit 120. Alternatively, all or part of the touch driving circuit 210 may be integrated with all or part of the data driving circuit 120 to be implemented as an integrated circuit.

The touch controller 220 may be implemented separately from the display controller 140 or integrated with the display controller 140 as one.

The touch sensing system of the touch display device 100 according to embodiments of the present disclosure may sense a touch based on self-capacitance or mutual-capacitance.

Hereinafter, for convenience of description, it is assumed that the touch sensing system of the touch display device 100 according to embodiments of the present disclosure senses a touch based on mutual-capacitance.

Hereinafter, examples of a touch sensor structure will be described with reference to FIGS. 3 and 4.

Figure 3:
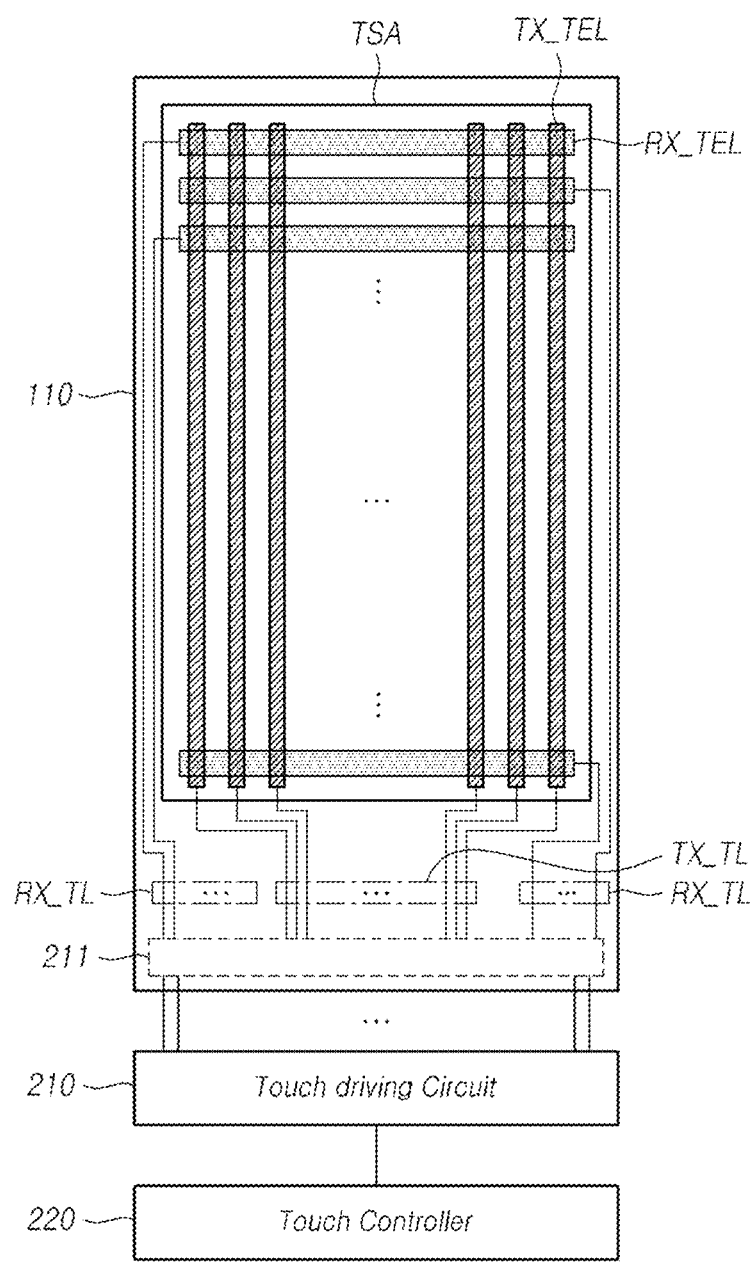
FIG. 3 illustrates a structure of a touch sensor of the touch display device according to embodiments of the present disclosure.

FIG. 3 shows a structure of a touch sensor of the touch display device 100 according to embodiments of the present disclosure. The touch sensor structure of the touch display device 100 according to the embodiments of the present disclosure illustrated in FIG. 3 may be a generalized touch sensor structure for sensing a touch based on mutual-capacitance.

Referring to FIG. 3, the touch sensor structure of the touch display device 100 according to embodiments of the present disclosure may include a plurality of touch electrode lines RX_TEL and TX_TEL. However, in this specification, each of the plurality of touch electrode lines RX_TEL and TX_TEL may also be referred to as touch electrodes.

For mutual-capacitance-based touch sensing, the plurality of touch electrode lines RX_TEL and TX_TEL may include a plurality of reception touch electrode lines RX_TEL and a plurality of transmission touch electrode lines TX_TEL.

The plurality of reception touch electrode lines RX_TEL and the plurality of transmission touch electrode lines TX_TEL may cross each other. Accordingly, a mutual-capacitance may be formed at points where the plurality of reception touch electrode lines RX_TEL and the plurality of transmission touch electrode lines TX_TEL overlap. Here, points where the plurality of reception touch electrode lines RX_TEL and the plurality of transmission touch electrode lines TX_TEL overlap may be referred to as touch nodes.

In other words, each of the plurality of transmission touch electrode lines TX_TEL may form mutual-capacitances with the plurality of reception touch electrode lines RX_TEL, respectively. At least one of the mutual-capacitances may be changed according to the presence or absence of a touch at the corresponding position.

Referring to FIG. 3, the touch sensor structure of the touch display device 100 according to embodiments of the present disclosure may include a plurality of touch routing lines RX_TL and TX_TL.

The plurality of touch routing lines RX_TL and TX_TL may include a plurality of reception touch routing lines RX_TL electrically connecting the plurality of reception touch electrode lines RX_TEL to the touch pad unit 211, and a plurality of transmission touch routing lines TX_TL electrically connecting the plurality of transmission touch electrode lines TX_TEL to the touch pad unit 211.

The plurality of reception touch routing lines RX_TL may be electrically connected to the touch driving circuit 210 through the touch pad unit 211. Accordingly, the plurality of reception touch routing lines RX_TL may electrically connect the plurality of reception touch electrode lines RX_TEL to the touch driving circuit 210.

The plurality of transmission touch routing lines TX_TL may be electrically connected to the touch driving circuit 210 through the touch pad unit 211. Accordingly, the plurality of transmission touch routing lines TX_TL may electrically connect the plurality of transmission touch electrode lines TX_TEL to the touch driving circuit 210.

The touch driving circuit 210 may supply a touch driving signal to at least one of the plurality of transmission touch electrode lines TX_TEL and sense at least one of the plurality of reception touch electrode lines RX_TEL.

The transmission touch electrode line TX_TEL may also be referred to as a driving touch electrode line, and the reception touch electrode line RX_TEL may also be referred to as a sensing touch electrode line.

As shown in FIG. 3, each of the plurality of reception touch electrode lines RX_TEL is disposed while extending in a row direction (e.g., an X-axis direction or a horizontal direction), and each of the plurality of transmission touch electrode lines TX_TEL may be disposed while extending in a column direction (e.g., a Y-axis direction or a vertical direction).

Conversely, each of the plurality of reception touch electrode lines RX_TEL is disposed while extending in a column direction (e.g., a Y-axis direction or a vertical direction), and each of the plurality of transmission touch electrode lines TX_TEL may be disposed while extending in a row direction (e.g., an X-axis direction or a horizontal direction).

Below, for convenience of explanation, as shown in FIG. 3, it is assumed that each of the plurality of reception touch electrode lines RX_TEL is disposed while extending in a row direction (e.g., an X-axis direction or a horizontal direction), and it is assumed that each of the plurality of transmission touch electrode lines TX_TEL is disposed while extending in a column direction (e.g., a Y-axis direction or a vertical direction). However, it is not limited thereto.

As shown in FIG. 3, each of the plurality of reception touch electrode lines RX_TEL may be one electrode in the form of a bar, and each of the plurality of transmission touch electrode lines TX_TEL may be one electrode in the form of a bar.

Alternatively, at least one of the reception touch electrode line RX_TEL and the transmission touch electrode line TX_TEL may include a plurality of touch electrodes electrically connected by connection patterns.

For example, one reception touch electrode line RX_TEL may be composed of a plurality of reception touch electrodes electrically connected by reception connection patterns, and one transmission touch electrode line TX_TEL may be one transmission touch electrode in a bar shape. Here, the plurality of reception touch electrodes and one transmitting touch electrode are located on the same layer. The reception connection patterns may be located on a different layer from the plurality of reception touch electrodes and one transmission touch electrode, or may be located on the same layer as the plurality of reception touch electrodes and one transmission touch electrode.

For another example, one reception touch electrode line RX_TEL may be one reception touch electrode in the form of a bar, and one transmission touch electrode line TX_TEL may include a plurality of transmission touch electrodes electrically connected by transmission connection patterns. Here, the plurality of transmission touch electrodes and one reception touch electrode are located on the same layer. The transmission connection patterns may be located on a different layer from the plurality of transmission touch electrodes and the one reception touch electrode, or may be located on the same layer as the plurality of transmission touch electrodes and the reception touch electrode.

As another example, one reception touch electrode line RX_TEL may be composed of a plurality of reception touch electrodes electrically connected by reception connection patterns, and one transmission touch electrode line TX_TEL may include a plurality of transmission touch electrodes electrically connected by transmission connection patterns. Here, the plurality of reception touch electrodes and the plurality of the transmission touch electrodes may be located on the same layer. At least one type of the reception connection patterns and the transmission connection patterns may be located on a different layer from the plurality of reception touch electrodes and the transmission touch electrodes.

Figure 4:
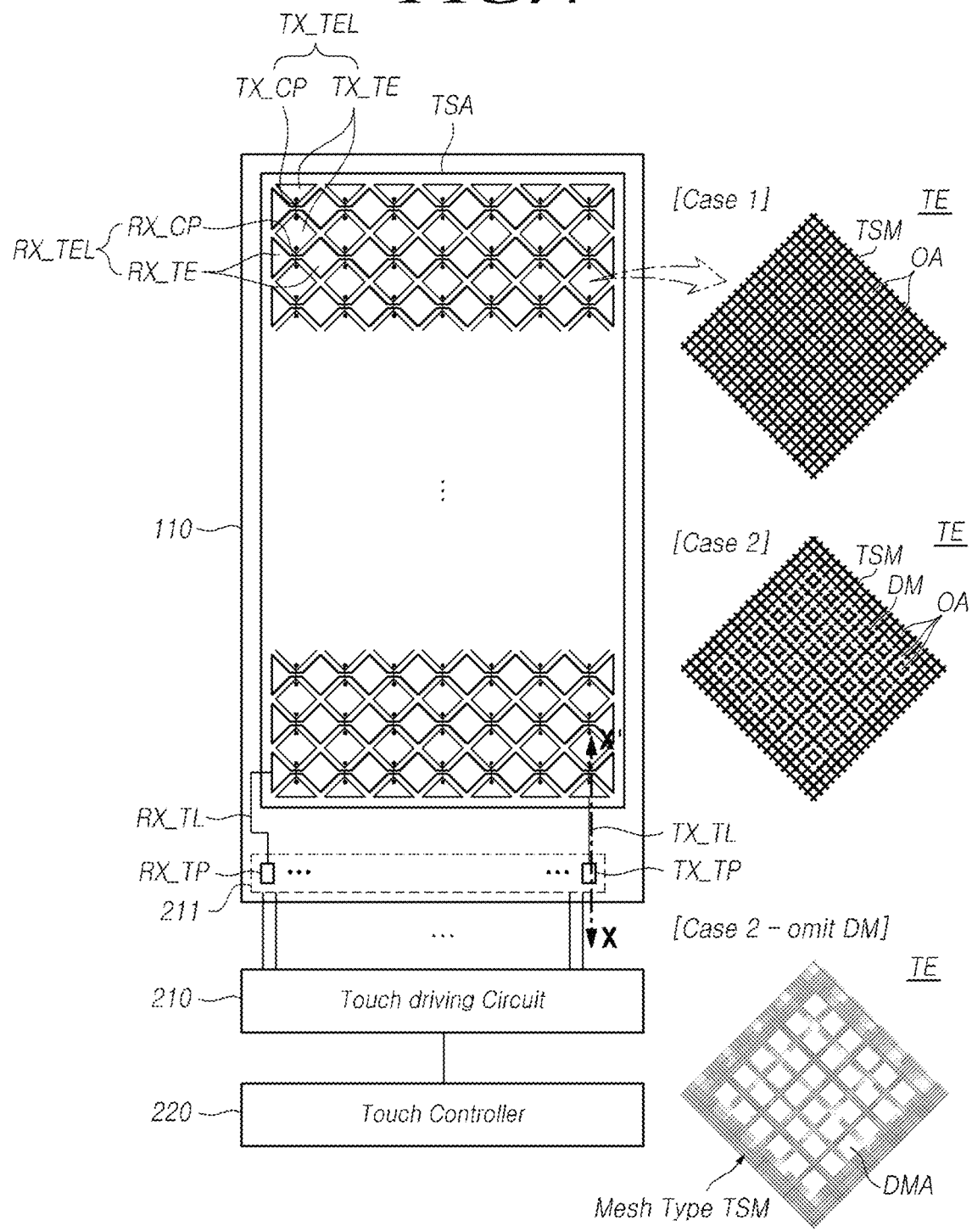
FIG. 4 illustrates another touch sensor structure of the touch display device according to embodiments of the present disclosure.

FIG. 4 shows another touch sensor structure of the touch display device 100 according to embodiments of the present disclosure.

Although FIG. 4 has a different touch sensor structure from FIG. 3, the touch sensor structure of FIG. 4 and the touch sensor structure of FIG. 3 are circuitly equivalent.

Referring to FIG. 4, each of the plurality of reception touch electrode lines RX_TEL disposed in the touch sensing area TSA may be configured of a plurality of reception touch electrodes RX_TE electrically connected by reception connection patterns RX_CP.

The reception connection patterns RX_CP may be located on the same layer as the plurality of reception touch electrodes RX_TE, or may be located on a different layer from the plurality of reception touch electrodes RX_TE.

When the reception connection patterns RX_CP are located on the same layer as the plurality of reception touch electrodes RX_TE, the reception connection patterns RX_CP and the plurality of reception touch electrodes RX_TE constituting one reception touch electrode line RX_TEL may be integrally formed.

Each of the plurality of transmission touch electrode lines TX_TEL disposed in the touch sensing area TSA may be configured of a plurality of transmission touch electrodes TX_TE electrically connected by transmission connection patterns TX_CP.

The transmission connection patterns TX_CP may be located on a different layer from the plurality of transmission touch electrodes TX_TE, or may be located on the same layer as the plurality of transmission touch electrodes TX_TE.

When the transmission connection patterns TX_CP are located on the same layer as the plurality of transmission touch electrodes TX_TE, the transmission connection patterns TX_CP and the plurality of transmission touch electrodes TX_TEs constituting one transmission touch electrode line TX_TEL may be integrally formed.

Referring to FIG. 4, a point where the reception connection pattern RX_CP and the transmission connection pattern TX_CP overlap is a touch node where the reception touch electrode line RX_TEL and the transmission touch electrode line TX_TEL overlap. Therefore, the reception connection pattern RX_CP and the transmission connection pattern TX_CP are located on different layers. That the reception connection pattern RX_CP and the transmission connection pattern TX_CP overlap may mean that the reception connection pattern RX_CP and the transmission connection pattern TX_CP cross while being electrically separated.

For example, as shown in FIG. 4, the reception connection patterns RX_CP may be located on the same layer as the plurality of reception touch electrodes RX_TE, and the transmission connection patterns TX_CP may be located on different layers from the plurality of transmission touch electrodes TX_TE.

Conversely, the reception connection patterns RX_CP may be located on different layers from the plurality of reception touch electrodes RX_TE, and the transmission connection patterns TX_CP may be located on the same layer as the plurality of transmission touch electrodes TX_TE.

Referring to FIG. 4, the touch sensor structure of the touch display device 100 according to embodiments of the present disclosure may include a plurality of touch routing lines RX_TL and TX_TL.

The plurality of touch routing lines RX_TL and TX_TL may include a plurality of reception touch routing lines RX_TL electrically connecting the plurality of reception touch electrode lines RX_TEL to the touch pad unit 211, and a plurality of transmission touch routing lines TX_TL electrically connecting the plurality of transmission touch electrode lines TX_TEL to the touch pad unit 211.

The plurality of reception touch routing lines RX_TL may be electrically connected to the touch driving circuit 210 through a plurality of reception touch pads RX_TP included in the touch pad unit 211. Accordingly, the plurality of reception touch routing lines RX_TL may electrically connect the plurality of reception touch electrode lines RX_TEL to the touch driving circuit 210.

The plurality of transmission touch routing lines TX_TL may be electrically connected to the touch driving circuit 210 through a plurality of transmission touch pads TX_TP included in the touch pad unit 211. Accordingly, the plurality of transmission touch routing lines TX_TL may electrically connect the plurality of transmission touch electrode lines TX_TEL to the touch driving circuit 210.

The touch driving circuit 210 may supply a touch driving signal to at least one of the plurality of transmission touch electrode lines TX_TEL and sense at least one of the plurality of reception touch electrode lines RX_TEL.

The transmission touch electrode lines TX_TEL may be referred to as driving touch electrode lines, and the reception touch electrode lines RX_TEL may also be referred to as sensing touch electrode lines.

Referring to FIG. 4, in the display panel 110 of the touch display device 100, each touch electrode TE (RX_TE, TX_TE) may be a plate-shaped touch sensor metal TSM without an opening. In this case, each touch electrode TE may be a transparent electrode. That is, each touch electrode TE may be made of a transparent electrode material so that light emitted from the plurality of sub-pixels SP disposed below may be transmitted upward.

Alternatively, as shown in FIG. 4, each touch electrode TE disposed on the display panel 110 may be of a mesh type like Case 1. In this case, each touch electrode TE may be formed of a touch sensor metal TSM that is patterned in a mesh type and formed with a plurality of openings OA. The touch sensor metal TSM of each touch electrode TE is a portion substantially corresponding to the touch electrode TE, and may be a portion to which a touch driving signal is applied or a portion to which a touch sensing signal is sensed. The touch sensor metal TSM corresponding to each touch electrode TE may be positioned on a bank disposed in an area other than the light emitting areas of the sub-pixels SP. The touch sensor metal TSM corresponding to each touch electrode TE may overlap the bank without overlapping the light emitting areas of the sub-pixels SP.

Figure 7:
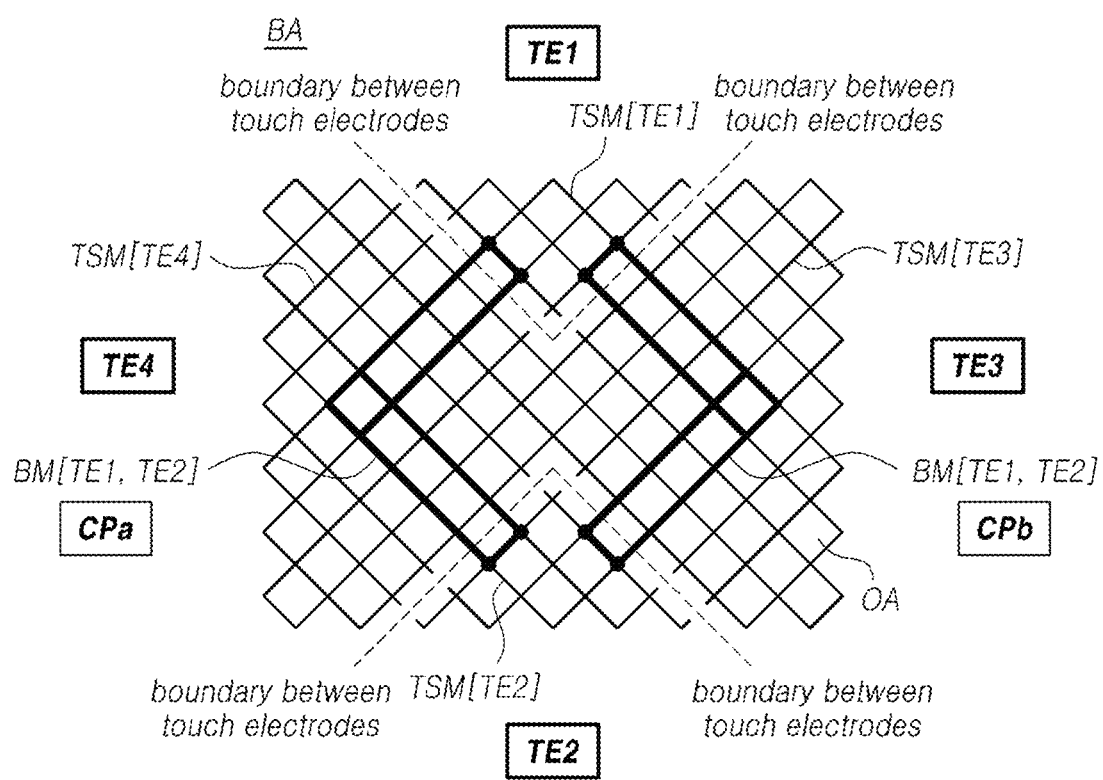
FIG. 7 illustrates a bridge area in an overlap area of a first touch electrode line and a second touch electrode line in the touch display device according to embodiments of the present disclosure.

A mesh type touch electrode TE is comprised of a number of lines of metal wire that intersect with each other. In one embodiment, a first set of metal wires extend in a first direction and second set of metal wires extend in a second direction, perpendicular to the first direction. The first and second set of metal wires intersect at right angles to form the mesh, as shown in FIGS. 4 and 7.

As shown in FIG. 4, as in Case 2, when each touch electrode TE is a touch sensor metal TSM patterned in a mesh type, a plurality of openings OA may exist in an area in which the touch electrode TE is formed. Each of the plurality of openings OA in each touch electrode TE may correspond to the light emitting area of one or more sub-pixels SP or may correspond to one or more transmissive areas. That is, the plurality of openings OA may serve as a path through which light emitted from one or more light emitting devices ED positioned below the touch electrode TE pass upward to form the light emitting area. Alternatively, the plurality of openings OA may serve as paths through which light is transmitted to form the transmission area.

For example, the outline shape of the touch electrode TE may have various shapes, such as a diamond shape, a rhombus shape, a quadrangle, a triangle, a pentagon, or a hexagon. Each of the plurality of openings OA may have various shapes according to the shape of the touch electrode TE or the mesh shape of the touch sensor metal TSM.

Referring to FIG. 4, as in case 2, one or more dummy metals DM may exist in the area of each touch electrode TE. One or more dummy metals DM may be separated from the mesh-type touch sensor metal TSM. The dummy metal DM may be positioned within the area of the touch electrode TE while being surrounded by the touch sensor metal TSM. Unlike the touch sensor metal TSM, the dummy metal DM is a portion to which a touch driving signal is not applied and a touch sensing signal is not sensed, and may be a floating metal. The touch sensor metal TSM is electrically connected to the touch driving circuit 210, but the dummy metal DM is not electrically connected to the touch driving circuit 210.

One or more dummy metals DM may be present in each area of all of the touch electrodes TE. Alternatively, one or more dummy metals DM may exist in only a portion of all the touch electrodes TE, and the dummy metal DM may not exist in other portions of all the touch electrodes TE.

Meanwhile, in relation to the role of the dummy metal DM, when one or more dummy metals DM do not exist in the area of the touch electrode TE and only the touch sensor metal TSM exists in a mesh type, a visibility issue in which the outline of the touch sensor metal TSM is visible on the screen may occur. In contrast, as shown in FIG. 4, when one or more dummy metals DM are present in the area of the touch electrode TE, a visibility issue in which the outline of the touch sensor metal TSM is visible on the screen may be prevented.

In addition, by adjusting the presence, number, or ratio of the dummy metal DM for each touch electrode TE, the capacitance may be adjusted for each touch electrode TE to improve touch sensitivity. Here, the ratio of the dummy metal DM in each touch electrode TE may be the ratio of the area occupied by the dummy metal DM in the area of the touch electrode TE. Alternatively, the ratio of the dummy metal DM in each touch electrode TE may be the ratio of the area of the touch sensor metal TSM to the area of the dummy metal DM.

Meanwhile, by cutting (or etching) some points in the touch sensor metal TSM formed in the area of one touch electrode TE, the cut touch sensor metal TSM may be formed of the dummy metal DM. That is, the touch sensor metal TSM and the dummy metal DM may be formed of the same material on the same layer.

Referring to FIG. 4, in Case 2, When the plurality of dummy metals DM present in the region of one touch electrode are omitted and only the touch sensor metal TSM is illustrated, a plurality of dummy areas DMA may exist in the area where the touch sensor metal TSM is disposed. The plurality of dummy areas DMA corresponds to the plurality of dummy metals DM.

Figure 5:
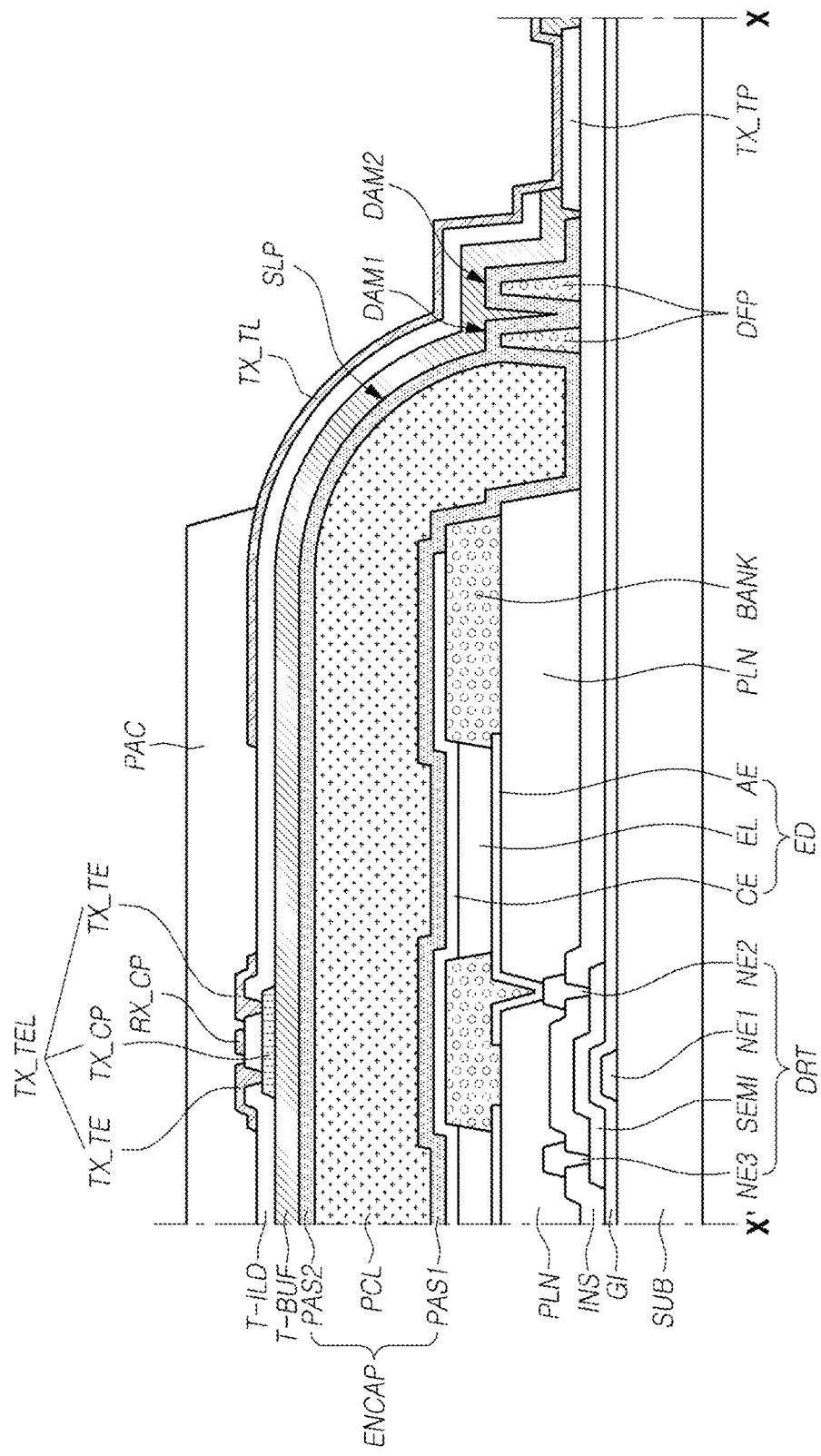
FIG. 5 is a cross-sectional view of the touch display device according to embodiments of the present disclosure.

FIG. 5 is a cross-sectional view of the touch display device 100 according to embodiments of the present disclosure. FIG. 5 is a cross-sectional view of the display panel 110 of the touch display device 100 according to embodiments of the present disclosure, and is a cross-sectional view taken along line X-X' of FIG. 4.

The driving transistor DRT in each sub-pixel SP in the display area DA is disposed on the substrate SUB. For example, the substrate SUB may be a glass substrate, a flexible substrate such as a plastic substrate, or a transparent substrate.

The driving transistor DRT may include a first node electrode NE1 corresponding to a gate node, a second node electrode NE2 corresponding to a source node or a drain node, and a third node electrode NE3 corresponding to a drain node or a source node. The driving transistor DRT may further include a semiconductor layer SEMI or the like.

A gate insulating layer GI may be positioned between the first node electrode NE1 and the semiconductor layer SEMI. The first node electrode NE1 and the semiconductor layer SEMI may overlap each other. The second node electrode NE2 may be formed on the insulating layer INS and connected to one side of the semiconductor layer SEMI through a contact hole. The third node electrode NE3 may be formed on the insulating layer INS and connected to the other side of the semiconductor layer SEMI through a different contact hole.

The light emitting device ED may include an anode electrode AE corresponding to a pixel electrode, a light emitting layer EL on the anode electrode AE, and a cathode electrode CE corresponding to a common electrode and positioned on the light emitting layer EL.

The anode electrode AE may be electrically connected to the second node electrode NE2 of the driving transistor DRT exposed through a pixel contact hole penetrating the planarization layer PLN.

The light emitting layer EL may be formed on the anode electrode AE of the light emitting area corresponding to the opening of the bank BANK. The light emitting layer EL may have a stack structure including a hole-related layer, a light emission generating layer, and an electron-related layer. The cathode electrode CE may be formed to face the anode electrode AE with the light emitting layer EL interposed therebetween.

The light emitting device ED is vulnerable to moisture or oxygen. The encapsulation layer ENCAP may prevent the light emitting device ED from being exposed to moisture or oxygen. That is, the encapsulation layer ENCAP may prevent penetration of moisture or oxygen. The encapsulation layer ENCAP may be formed of one layer, or may include a plurality of layers PAS1, PCL, and PAS2 as shown in FIG. 5.

For example, when the encapsulation layer ENCAP consists of a plurality of layers PAS1, PCL, and PAS2, the encapsulation layer ENCAP may include one or more inorganic encapsulation layers PAS1 and PAS2 and at least one organic encapsulation layer PCL. As a specific example, the encapsulation layer ENCAP has a structure in which a first inorganic encapsulation layer PAS1, an organic encapsulation layer PCL, and a second inorganic encapsulation layer PAS2 are sequentially stacked.

For example, the organic encapsulation layer PCL may further include at least one organic encapsulation layer or at least one inorganic encapsulation layer.

The first inorganic encapsulation layer PAS1 may be disposed on the cathode electrode CE and is disposed closest to the light emitting device ED. The first inorganic encapsulation layer PAS1 may be formed of an inorganic insulating material capable of low-temperature deposition. For example, the first inorganic encapsulation layer PAS1 may be made of silicon nitride (SiNx), silicon oxide (SiOx), silicon oxynitride (SiON), or aluminum oxide (Al2O3). Since the first inorganic encapsulation layer PAS1 may be deposited in a low temperature atmosphere, during the deposition process, the first inorganic encapsulation layer PAS1 may prevent the light emitting layer EL including an organic material vulnerable to a high temperature atmosphere from being damaged.

The organic encapsulation layer PCL may have a smaller area than the first inorganic encapsulation layer PAS1. In this case, the first inorganic encapsulation layer PAS1 may be disposed to extend to the outside of the organic encapsulation layer PCL. The organic encapsulation layer PCL may serve as a buffer for relieving stress between layers due to bending of the touch display device 100, which is an organic light emitting display device, and may serve to enhance planarization performance. For example, the organic encapsulation layer PCL may be an acrylic resin, an epoxy resin, polyimide, polyethylene, or silicon oxycarbon (SiOC), and may be formed of an organic insulating material. For example, the organic encapsulation layer PCL may be formed through an inkjet method.

In order to prevent the encapsulation layer ENCAP from collapsing, the display panel 110 may further include one or more dams DAM1 and DMA2 located in the vicinity of the outermost point of the inclined surface SLP of the encapsulation layer ENCAP.

The one or more dams DAM1 and DMA2 may exist at or near the boundary point between the display area DA and the non-display area NDA. For example, the one or more dams DAM1 and DMA2 may be located at or near an end point of the inclined surface SLP of the encapsulation layer ENCAP.

One or more dams DAM1 and DMA2 may be disposed between the touch pad unit 211 including the touch pad TX_TP and the display area DA. The one or more dams DAM1 and DMA2 may be formed of a dam formation pattern DFP or the like. For example, the dam formation pattern DFP may include the same material as the bank BANK.

The one or more dams DAM1 and DMA2 may be located only in the non-display area NDA. Alternatively, most of the one or more dams DAM1 and DMA2 may exist in the non-display area NDA, and a portion of the one or more dams DAM1 and DMA2 may span the display area DA.

When two or more dams DAM1 and DMA2 are formed to prevent the encapsulation layer ENCAP from collapsing, the dam closest to the display area DA is referred to as a primary dam DAM1. The dam located next to the primary dam DAM1 and located outside the primary dam DAM1 is called the secondary dam DAM2. The primary dam DAM1 is located relatively closer to the display area DA than the secondary dam DAM2. The secondary dam DAM2 may be located relatively closer to the touch pad unit 211 than the primary dam DAM1.

When the liquid organic encapsulation layer PCL is dropped on the display area DA, the liquid organic encapsulation layer PCL may collapse in the direction of the non-display area NDA. The collapsed organic encapsulation layer PCL may invade the pad area and cover the touch pad unit 211 and the like. The collapse of the organic encapsulation layer PCL may be prevented by one or more dams DAM1 and DMA2. The collapse preventing effect of the organic encapsulation layer PCL may be increased when two or more dams DAM1 and DAM2 are formed, as shown in FIG. 5.

The primary dam DAM1 and/or the secondary dam DAM2 may be formed in a single-layer or multi-layer structure. The primary dam DAM1 and/or the secondary dam DAM2 may be basically made of a dam formation pattern DFP. The dam formation pattern DFP may have a higher height than the touch pad TX_TP disposed on the touch pad unit 211.

The dam formation pattern DFP may be formed of the same material as the bank BANK for separating the sub-pixels SP from each other, or may be formed of the same material as a spacer for maintaining an interlayer gap. In this case, the dam formation pattern DFP may be formed at the same time as the bank or the spacer, and thus the dam structure may be formed without an additional mask process and cost increase.

Referring to FIG. 5, the first inorganic encapsulation layer PAS1 and/or the second inorganic encapsulation layer PAS2 may be disposed to extend below or above the dam formation pattern DFP. In this case, the primary dam DAM1 and/or the secondary dam DAM2 may further include a first inorganic encapsulation layer PAS1 and/or a second inorganic encapsulation layer PAS2 disposed to extend below or above the dam formation pattern DFP.

The organic encapsulation layer PCL including the organic material may be located only on the inner side of the innermost primary dam DAM1. That is, the organic encapsulation layer PCL may not exist on all of the dams DAM1 and DAM2. Alternatively, the organic encapsulation layer PCL including an organic material may be located on at least the primary dam DAM1 among the primary dam DAM1 and the secondary dam DAM2. That is, the organic encapsulation layer PCL may be extended only to the upper portion of the primary dam DAM1. Alternatively, the organic encapsulation layer PCL may extend past the upper portion of the primary dam DAM1 and extend to the upper portion of the secondary dam DAM2.

The second inorganic encapsulation layer PAS2 may be disposed on the substrate SUB on which the organic encapsulation layer PCL is formed. The second inorganic encapsulation layer PAS2 may be formed to cover an upper surface and a side surface of each of the organic encapsulation layer PCL and the first inorganic encapsulation layer PAS1. The second inorganic encapsulation layer PAS2 can minimize, reduce or block external moisture or oxygen from penetrating into the first inorganic encapsulation layer PAS1 and the organic encapsulation layer PCL.

Referring to FIG. 5, a touch sensor may be disposed on the encapsulation layer ENCAP. A touch buffer layer T-BUF may be additionally disposed between the encapsulation layer ENCAP and the touch sensor.

Referring to FIGS. 5 and 4, the touch sensor may include touch electrode lines RX_TEL and TX_TEL and touch routing lines RX_TL and TX_TL. The touch electrode lines RX_TEL and TX_TEL may include touch electrodes RX_TE and TX_TE and connection patterns RX_CP and TX_CP.

The touch electrode lines RX_TEL and TX_TEL may include reception touch electrode lines RX_TEL and transmission touch electrode lines TX_TEL. Each reception touch electrode line RX_TEL may include reception touch electrodes RX_TE and reception connection patterns RX_CP. Each transmission touch electrode line TX_TEL may include transmission touch electrodes TX_TE and transmission connection patterns TX_CP.

The touch routing lines RX_TL and TX_TL may include reception touch routing lines RX_TL and transmission touch routing lines TX_TL. All or part of the transmission touch routing lines TX_TL may be disposed on the touch buffer layer T-BUF. All or part of the reception touch routing line RX_TL may be disposed on the touch buffer layer T-BUF.

Since the touch sensor is positioned on the encapsulation layer ENCAP, which is an insulating material layer, a parasitic capacitance may be formed between the touch sensor and the cathode electrode CE.

When the touch buffer layer T-BUF is additionally disposed between the encapsulation layer ENCAP and the touch sensor, due to the thickness of the touch buffer layer T-BUF, the separation distance between the touch sensors TX_TE, TX_CP, RX_TE, and RX_CP and the cathode electrode CE may be further increased. For example, the separation distance between the touch sensors TX_TE, TX_CP, RX_TE, and RX_CP and the cathode electrode CE may be a predetermined or selected minimum or reduced separation distance (e.g., 5 µm) or may be a predetermined optimal or selected separation distance.

When the touch buffer layer T-BUF is additionally disposed between the encapsulation layer ENCAP and the touch sensor TX_TE, TX_CP, RX_TE, and RX_CP, parasitic capacitance between the touch sensor and the cathode electrode CE may be further reduced. Through this, the touch sensitivity due to the parasitic capacitance may be further improved.

The touch buffer layer T-BUF may not exist on the encapsulation layer ENCAP. That is, the touch buffer layer T-BUF may not be disposed between the encapsulation layer ENCAP and the touch sensor.

During the manufacturing process of the touch sensor, a chemical solution (developer or etchant, etc.) used in the process or moisture from the outside may be generated. By disposing the touch buffer layer T-BUF and disposing the touch sensor thereon, it is possible to prevent the chemical solution or moisture from penetrating into the light emitting layer EL including an organic material during the manufacturing process of the touch sensor. Accordingly, the touch buffer layer T-BUF may prevent damage to the light emitting layer EL, which is vulnerable to the chemical solution or moisture.

The touch buffer layer T-BUF may be formed at a low temperature below a certain temperature (e.g., 100 degrees (° C.)) in order to prevent damage to the light emitting layer EL containing an organic material that is vulnerable to high temperature, and may be formed of an organic insulating material having a low dielectric constant of 1 to 3. As the organic light emitting display device is bent, each layer PAS1, PCL, and PAS2 in the encapsulation layer ENCAP may be damaged, and the metal (hereinafter referred to as touch sensor metal) constituting the touch sensor positioned on the touch buffer layer T-BUF may be broken. Even when the organic light emitting display device is bent, the touch buffer layer T-BUF made of an organic insulating material and having planarization performance may prevent damage to the encapsulation layer ENCAP and/or breakage of the touch sensor metal.

According to the mutual-capacitance-based touch sensor structure, the reception touch electrode line RX_TEL and the transmission touch electrode line TX_TEL may cross each other.

Referring to FIGS. 5 and 4, each transmission touch electrode line TX_TEL may include a plurality of transmission touch electrodes TX_TE and a plurality of transmission bridge electrodes TX_CP. The plurality of transmission bridge electrodes TX_CP may electrically connect adjacent transmission touch electrodes TX_TE among the plurality of transmission touch electrodes TX_TE. Here, the transmission bridge electrodes TX_CP are electrodes corresponding to the transmission connection patterns TX_CP.

The transmission touch electrodes TX_TE and the transmission bridge electrodes TX_CP may be positioned on different layers with the touch-interlayer insulating layer T-ILD interposed therebetween. That is, the touch-interlayer insulating layer T-ILD may be disposed between the transmission touch electrodes TX_TE and the transmission bridge electrodes TX_CP.

The transmission bridge electrode TX_CP may be formed on the touch buffer layer T-BUF. The transmission bridge electrode TX_CP can be electrically connected to the adjacent transmission touch electrodes TX_TE positioned on the touch-interlayer insulating layer T-ILD through a contact hole of the touch-interlayer insulating layer T-ILD. The transmission bridge electrode TX_CP may be disposed to overlap the bank BANK. Accordingly, a decrease in the aperture ratio by the transmission bridge electrode TX_CP may be prevented.

Referring to FIGS. 5 and 4, each reception touch electrode line RX_TEL may include a plurality of reception touch electrodes RX_TE and a plurality of reception connection patterns RX_CP. The plurality of reception connection patterns RX_CP may electrically connect adjacent reception touch electrodes RX_TE among the plurality of reception touch electrodes RX_TE.

The plurality of reception touch electrodes RX_TE and the plurality of reception connection patterns RX_CP may be positioned on different layers with the touch-interlayer insulating layer T-ILD interposed therebetween. Alternatively, the plurality of reception touch electrodes RX_TE and the plurality of reception connection patterns RX_CP may be integrally formed and disposed on the touch-interlayer insulating layer T-ILD.

Referring to FIGS. 5 and 4, the transmission touch electrode line TX_TEL may be electrically connected to the transmission touch pad TX_TP existing in the touch pad unit 211 in the non-display area NDA through the transmission touch routing line TX_TL. Similarly, the reception touch electrode line RX_TEL may be electrically connected to the reception touch pad RX_TP existing in the touch pad unit 211 in the non-display area NDA through the reception touch routing line RX_TL.

The transmission touch pad TX_TP included in the touch pad unit 211 may be electrically connected to the touch driving circuit 210. The reception touch pad RX_TP included in the touch pad unit 211 may be electrically connected to the touch driving circuit 210.

The transmission touch pad TX_TP may be formed separately from the transmission touch routing line TX_TL, or the transmission touch pad TX_TP may be an extended portion of the transmission touch routing line TX_TL. Similarly, the reception touch pad RX_TP may be formed separately from the reception touch routing line RX_TL, or the reception touch pad RX_TP may be an extended portion of the reception touch routing line RX_TL.

At least one of the transmission touch pad TX_TP, the transmission touch routing line TX_TL, the reception touch pad RX_TP, and the reception touch routing line RX_TL may include at least one first conductive material, and may be formed in a single-layer or multi-layer structure. For example, the at least one first conductive material may include one or more of Al, Ti, Cu, Mo, or the like, and may be a metal having strong corrosion resistance, strong acid resistance, and good conductivity.

For example, at least one of the transmission touch pad TX_TP, the transmission touch routing line TX_TL, the reception touch pad RX_TP, and the reception touch routing line RX_TL may be formed in a three-layer stacked structure such as Ti/Al/Ti or Mo/Al/Mo.

The pad cover electrode capable of covering the transmission touch pad TX_TP and the reception touch pad RX_TP may include at least one second conductive material. For example, the at least one second conductive material may include a transparent conductive material (e.g., ITO, IZO, etc.) having strong corrosion resistance and strong acid resistance. The pad cover electrode is formed to be exposed by the touch buffer layer T-BUF, and thus may be bonded to the touch driving circuit 210 or to the circuit film on which the touch driving circuit 210 is mounted. The second conductive material may also be included in the touch sensors RX_TE, TX_TE, RX_CP, and TX_CP.

The touch buffer layer T-BUF may be formed to cover the touch sensor metal to prevent the touch sensor metal from being corroded by external moisture. For example, the touch buffer layer T-BUF may be formed of an organic insulating material, a circularly polarizing plate, or a film made of an epoxy or acrylic material. The touch buffer layer T-BUF may not be on the encapsulation layer ENCAP. That is, the touch buffer layer T-BUF may not be an essential component (e.g., may be an optional component).

Referring to FIG. 5, the transmission touch routing line TX_TL may be electrically connected to the transmission touch electrode line TX_TEL and extend to be disposed along the inclined surface SLP of the encapsulation layer ENCAP. The transmission touch routing line TX_TL may descend along the inclined surface SLP of the encapsulation layer ENCAP, pass over the upper portion of at least one dam DAM1 and DAM2, and be electrically connected to the transmission touch pad TX_TP included in the touch pad unit 211.

Similarly, the reception touch routing line RX_TL may be electrically connected to the reception touch electrode line RX_TEL and extend to be disposed along the inclined surface SLP of the encapsulation layer ENCAP. The reception touch routing line RX_TL may descend along the inclined surface SLP of the encapsulation layer ENCAP, pass over the upper portion of at least one dam DAM1 and DAM2, and be electrically connected to the reception touch pad RX_TP included in the touch pad unit 211.

A touch protection layer PAC may be disposed on the reception touch electrode lines RX_TEL and the transmission touch electrode lines TX_TEL. The touch protection layer PAC may extend before or after the one or more dams DAM1 and DAM2 and may also be disposed on the reception touch routing lines RX_TL and the transmission touch routing lines TX_TL. For example, the touch protection layer PAC may be an organic layer.

Meanwhile, the cross-sectional view of FIG. 5 conceptually shows the structure. The position, thickness, or width of each pattern (various layers or various electrodes) may be changed according to the viewing direction or position, and the connection structure of the various patterns may also be changed. In addition, an additional layer may exist in addition to the several layers shown in FIG. 5, and some of the multiple layers shown in FIG. 5 may be omitted or integrated. For example, the width of the bank BANK may be narrower than the width shown in FIG. 5, and the heights of the dams DAM1 and DAM2 may be lower or higher than the height shown in FIG. 5.

Meanwhile, the display panel 110 of the touch display device 100 according to embodiments of the present disclosure may have a top emission structure. In this case, the anode electrodes AE may be a reflective metal, and the cathode electrode CE may be a transparent conductive layer.

Hereinafter, a structure of a touch sensor embedded in the display panel 110 of the touch display device 100 according to embodiments of the present disclosure will be described in more detail with reference to FIGS. 6 to 12. However, hereinafter, for convenience of description, the first touch electrode line TEL1 arranged in a horizontal direction and the second touch electrode line TEL2 arranged in the vertical direction are taken as examples.

The touch display device 100 referred to by this specification may be interpreted as the display panel 110 according to an embodiment. For example, the touch sensor structure (e.g., touch electrode lines (TEL1, TEL2), overlap area (ISA)) in the touch display device 100 described by the present specification may be interpreted as being applied to the display panel 110. In this case, the touch display device 100 may correspond to the display panel 110.

Figure 6:
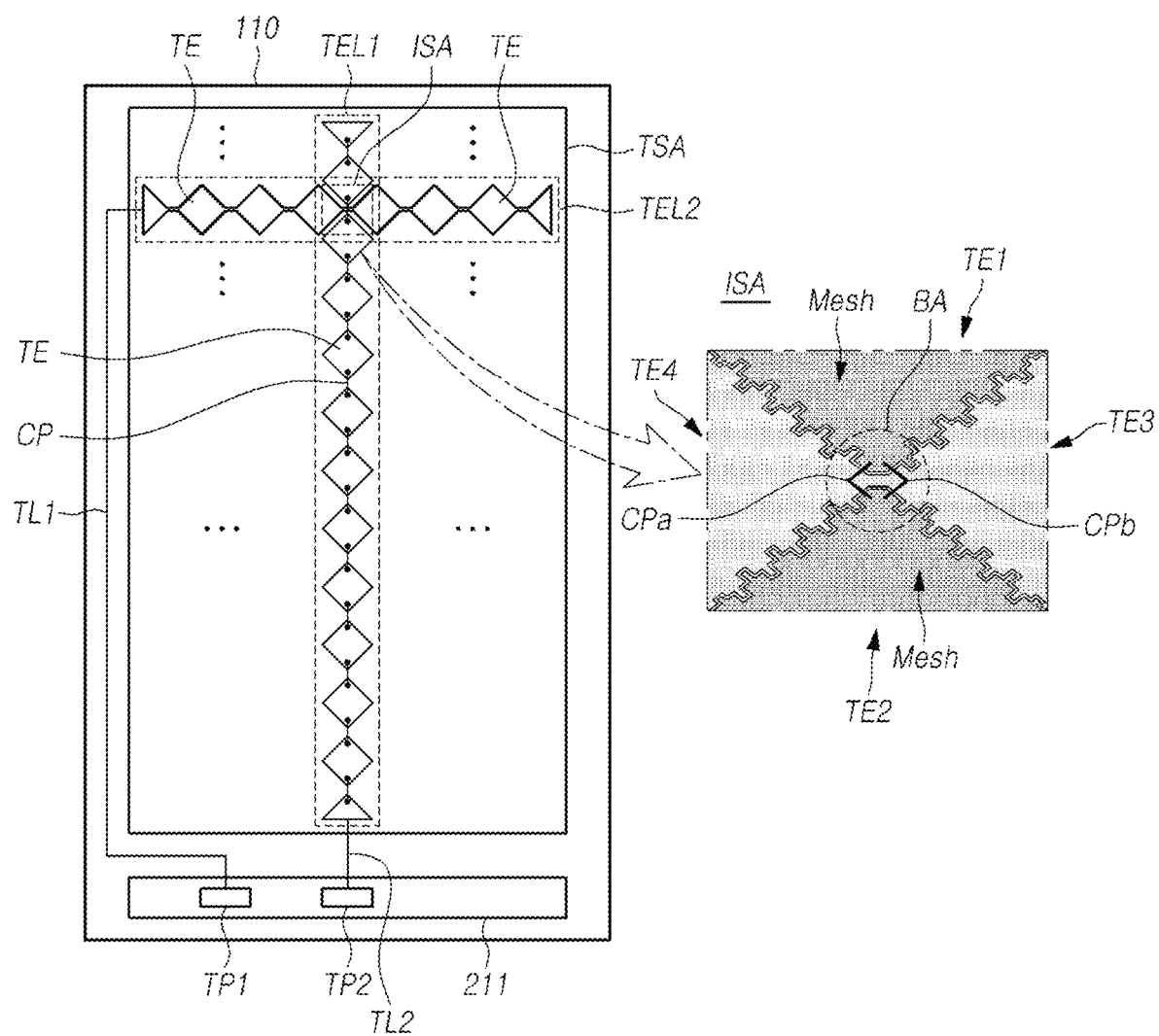
FIG. 6 illustrates an overlap area of two touch electrode lines in the touch display device according to embodiments of the present disclosure.

FIG. 6 shows an overlap area ISA of two touch electrode lines TEL1 and TEL2 in the touch display device 100 according to embodiments of the present disclosure.

Referring to FIG. 6, the display panel 110 of the touch display device 100 according to embodiments of the present disclosure may include a touch sensing area TSA and a touch pad unit 211. The touch sensing area TSA is an area in which a touch sensor for touch sensing is disposed, and may have the same area as the display area DA, or a slightly smaller or larger area than the display area DA.

Referring to FIG. 6, the display panel 110 of the touch display device 100 according to embodiments of the present disclosure may include a first touch electrode line TEL1 and a second touch electrode line TEL2 disposed on a substrate SUB. The first touch electrode line TEL1 and the second touch electrode line TEL2 may cross each other.

Referring to FIG. 6, the first touch electrode line TEL1 may include the plurality of touch electrodes TE and at least one connection pattern CP for electrically connecting the plurality of touch electrodes TE.

For example, the plurality of touch electrodes TE included in the first touch electrode line TEL1 may include a first touch electrode TE1 and a second touch electrode TE2. The at least one connection pattern CP included in the first touch electrode line TEL1 may include a first connection pattern CPa for electrically connecting the first touch electrode TE1 and the second touch electrode TE2. The at least one connection pattern CP included in the first touch electrode line TEL1 may further include an additional second connection pattern CPb electrically connecting the first touch electrode TE1 and the second touch electrode TE2. That is, the first touch electrode TE1 and the second touch electrode TE2 may be electrically connected through the first connection pattern CPa and the second connection pattern CPb.

Referring to FIG. 6, the second touch electrode line TEL2 may include a plurality of touch electrodes TE. The plurality of touch electrodes TE included in the second touch electrode line TEL2 may be integrally formed.

For example, the plurality of touch electrodes TE included in the second touch electrode line TEL2 may include a third touch electrode TE3 and a fourth touch electrode TE4. The third touch electrode TE3 and the fourth touch electrode TE4 may be integrally formed.

Referring to FIG. 6, the touch sensors disposed in the overlap area ISA where the first touch electrode line TEL1 and the second touch electrode line TEL2 overlap may include the first touch electrode TE1, the second touch electrode TE2, the first connection pattern CPa, the third touch electrode TE3, and a fourth touch electrode TE4.

In the crossing area ISA between the first touch electrode line TEL1 and the second touch electrode line TEL2, the connection portions CPa and CPb between the first touch electrode TE1 and the second touch electrode TE2 and the connection portion between the third touch electrode TE3 and the fourth touch electrode TE4 may overlap each other. The connection portion of the third touch electrode TE3 and the fourth touch electrode TE4 are in the same layer as the touch electrodes themselves. Namely, this connection portion is a continuation of the same mesh pattern and integrally formed with the third touch electrode TE3 and the fourth touch electrode TE4.

Since the first touch electrode line TEL1 and the second touch electrode line TEL2 must be electrically separated, the connection parts CPa and CPb between the first touch electrode TE1 and the second touch electrode TE2 and the connection part between the third touch electrode TE3 and the fourth touch electrode TE4 should be electrically separated. The connection parts CPa and CPb between the first touch electrode TE1 and the second touch electrode TE2 are below the connection portion of the third touch electrode TE3 and the fourth touch electrode TE4 and are aligned with the metal lines that make up the mesh of these electrode TE3 and TE4.

The first touch electrode line TEL1 may be electrically connected to the first touch pad TP1 through the first touch routing line TL1. The outermost touch electrode TE among the plurality of touch electrodes TE included in the first touch electrode line TEL1 may be electrically connected to the first touch pad TP1 through the first touch routing line TL1.

The second touch electrode line TEL2 may be electrically connected to the second touch pad TP2 through the second touch routing line TL2. The outermost touch electrode TE among the plurality of touch electrodes TE included in the second touch electrode line TEL2 may be electrically connected to the second touch pad TP2 through the second touch routing line TL2.

The first touch electrode line TEL1 may be a transmission touch electrode line TX_TEL, and the second touch electrode line TEL2 may be a reception touch electrode line RX_TEL. Accordingly, the first touch electrode TE1 and the second touch electrode TE2 may be the transmission touch electrodes TX_TE, and the third and fourth touch electrodes TE3 and the fourth touch electrode TE4 may be the reception touch electrodes RX_TE. Also, accordingly, the first touch routing line TL1 may be a transmission touch routing line TX_TL, and the second touch routing line TL2 may be a reception touch routing line RX_TL.

Conversely, the second touch electrode line TEL2 may be the transmission touch electrode line TX_TEL, and the first touch electrode line TEL1 may be the reception touch electrode line RX_TEL. Accordingly, the third touch electrode TE3 and the fourth touch electrode TE4 may be the transmission touch electrodes TX_TE, and the first and second touch electrodes TE1 and the second touch electrode TE2 may be the reception touch electrodes RX_TE. In addition, according to this, the second touch routing line TL2 may be a transmission touch routing line TX_TL, and the first touch routing line TL1 may be a reception touch routing line RX_TL.

Hereinafter, the structure of the touch sensor in the bridge area BA in the overlap area ISA between the first touch electrode line TEL1 and the second touch electrode line TEL2 will be described in more detail. The bridge area BA is an area in which the first touch electrode TE1 and the second touch electrode TE2 are electrically connected through the first and second connection patterns CPa and CPb. Also, the bridge area BA is an area where the connection portion (first connection pattern CPa and second connection pattern CPb) between the first and second touch electrodes TE1 and TE2 and the connection portion between the third and fourth touch electrodes TE3 and TE4 substantially cross each other.

Figure 8:
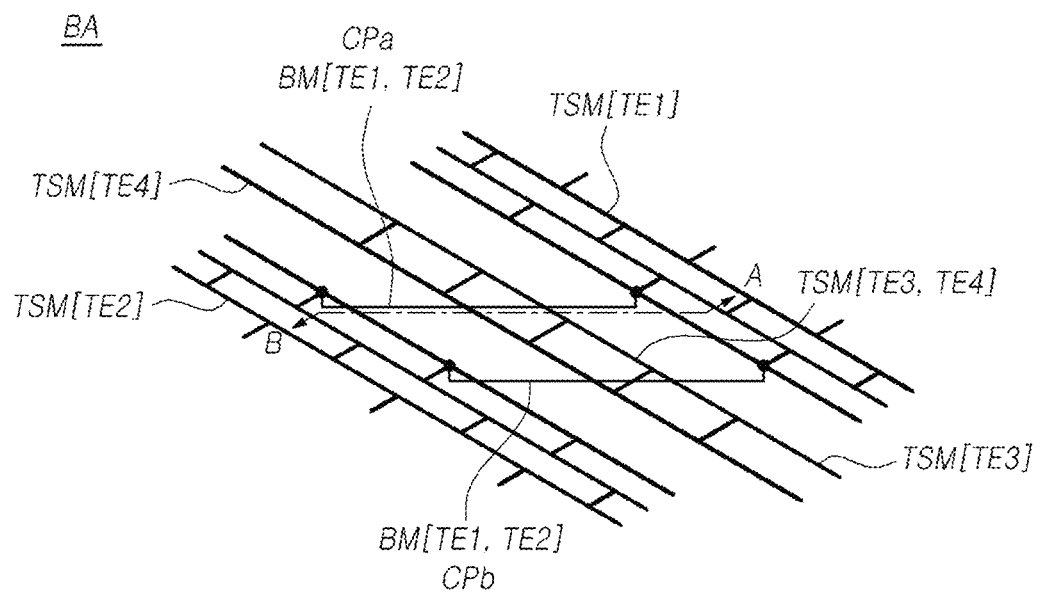
FIG. 8 conceptually illustrates a structure of a touch sensor in the bridge area in the touch display device according to embodiments of the present disclosure.
Figure 9:
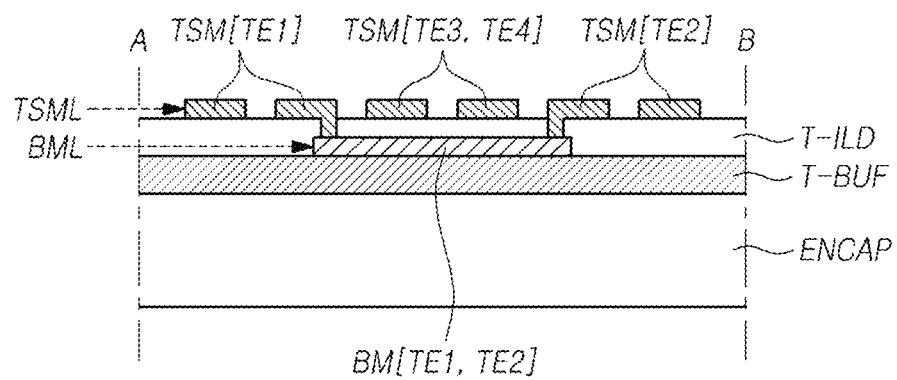
FIG. 9 is a cross-sectional view taken along line A-B in the bridge area of FIG. 8.

FIG. 7 illustrates the bridge area BA in the overlap area ISA of the first touch electrode line TEL1 and the second touch electrode line TEL2 in the touch display device 100 according to embodiments of the present disclosure, FIG. 8 conceptually illustrates a touch sensor structure in the bridge area BA in the touch display device 100 according to embodiments of the present disclosure, and FIG. 9 is a cross-sectional view taken along line A-B in the bridge area BA of FIG. 8.

In one embodiment as shown in FIG. 7, the wires that comprise the bridge metal mesh connection pattern BM to link the TE1 to TE2 are positioned exactly under the wires that comprise the mesh TE3 and TE4. Namely, the wires of the bridge metal mesh connection pattern BM to link the TE1 to TE2 are aligned with and exactly below the wires that comprise the mesh TE3 and TE4 and are separated by an insulation layer. This can be seen by the darker lines at the location of CPa and CPb because two metal lines exactly overlap and are separated by an insulation layer.

Referring to FIGS. 7 to 9, the touch display device 100 according to embodiments of the present disclosure may include two metals for forming the touch sensor structure.

For example, the two metals for forming the touch sensor structure may include a touch sensor metal and a bridge metal. The touch sensor metal may be a metal constituting the touch electrodes TE, and the bridge metal may be a metal constituting the connection patterns CPa and CPb.

Referring to FIG. 9, the bridge metal may be disposed on the touch buffer layer T-BUF on the encapsulation layer ENCAP. Hereinafter, the layer on which the bridge metal is located is referred to as a bridge metal layer BML. A touch-interlayer insulating layer T-ILD may be disposed on the bridge metal layer BML, and the touch sensor metal may be disposed on the touch-interlayer insulating layer T-ILD. Hereinafter, the layer on which the touch sensor metal is located is referred to as a touch sensor metal layer TSML.

Referring to FIGS. 7 to 9, the first touch electrode TE1 may include a first touch sensor metal electrode TSM[TE1] formed of the touch sensor metal. The first touch sensor metal electrode TSM[TE1] may be a mesh-type electrode having two or more openings OA.

The second touch electrode TE2 may include a second touch sensor metal electrode TSM[TE2] formed of the touch sensor metal. The second touch sensor metal electrode TSM[TE2] may be a mesh-type electrode having two or more openings OA.

The third touch electrode TE3 may include a third touch sensor metal electrode TSM[TE3] formed of the touch sensor metal. The third touch sensor metal electrode TSM[TE3] may be a mesh-type electrode having two or more openings OA.

The fourth touch electrode TE4 may include a fourth touch sensor metal electrode TSM[TE4] formed of the touch sensor metal. The fourth touch sensor metal electrode TSM[TE4] may be a mesh-type electrode having two or more openings OA.

Referring to FIGS. 7 to 9, the third touch sensor metal electrode TSM[TE3] of the third touch electrode TE3 and the fourth touch sensor metal electrode TSM[TE4] of the fourth touch electrode TE4 may be integrally connected (formed).

Referring to FIGS. 7 to 9, the first touch sensor metal electrode TSM[TE1] of the first touch electrode TE1 and the second touch sensor metal electrode TSM[TE2] of the second touch electrode TE2 may be disposed to be spaced apart from each other.

The first touch sensor metal electrode TSM[TE1] of the first touch electrode TE1 and the second touch sensor metal electrode TSM[TE2] of the second touch electrode TE2 may be electrically connected through a first connection pattern CPa.

For a stable connection, the first touch sensor metal electrode TSM[TE1] of the first touch electrode TE1 and the second touch sensor metal electrode TSM[TE2] of the second touch electrode TE2 may be electrically connected through the first connection pattern CPa and a second connection pattern CPb.

Each of the first connection pattern CPa and the second connection pattern CPb may include a bridge metal connection pattern BM[TE1, TE2] formed of a bridge metal.

Referring to FIGS. 7 to 9, a connection portion (TSM [TE3, TE4]) between the third touch sensor metal electrode TSM[TE3] and the fourth touch sensor metal electrode TSM[TE4] may cross the first connection pattern CPa and the second connection pattern CPb. The first connection pattern CPa and the second connection pattern CPb may be patterns that electrically connect the first touch sensor metal electrode TSM[TE1] and the second touch sensor metal electrode TSM[TE2].

Referring to FIGS. 7 to 9, the connection part (TSM[TE3, TE4]) between the third touch sensor metal electrode (TSM [TE3]) and the fourth touch sensor metal electrode (TSM [TE4]) may be located in the touch sensor metal layer (TSML). The bridge metal connection patterns BM[TE1, TE2] constituting the first connection pattern CPa and the second connection pattern CPb may be located in the bridge metal layer BML.

Accordingly, the first touch electrode line TEL1 including the first and second touch electrodes TE1 and TE2 and the second touch electrode line TEL2 including the third and fourth touch electrodes TE3 and TE4 may overlap but be electrically isolated from each other.

Meanwhile, as described above, the touch electrodes TE serving as a substantial touch sensor for touch sensing may be formed of a single metal layer called the touch sensor metal layer TSM. Accordingly, the touch electrodes TE may have a resistance large enough to adversely affect the touch sensitivity. In particular, as the display panel 110 has a large area, a length of a signal transmission path may increase, and thus, an increase in resistance of the touch electrodes TE may be further increased.

Accordingly, the touch display device 100 according to embodiments of the present disclosure can have a resistance reduction type touch sensor structure. Hereinafter, the resistance reduction type touch sensor structure in the touch display device 100 according to embodiments of the present disclosure will be described in more detail with reference to FIGS. 10 to 12.

Figure 10:
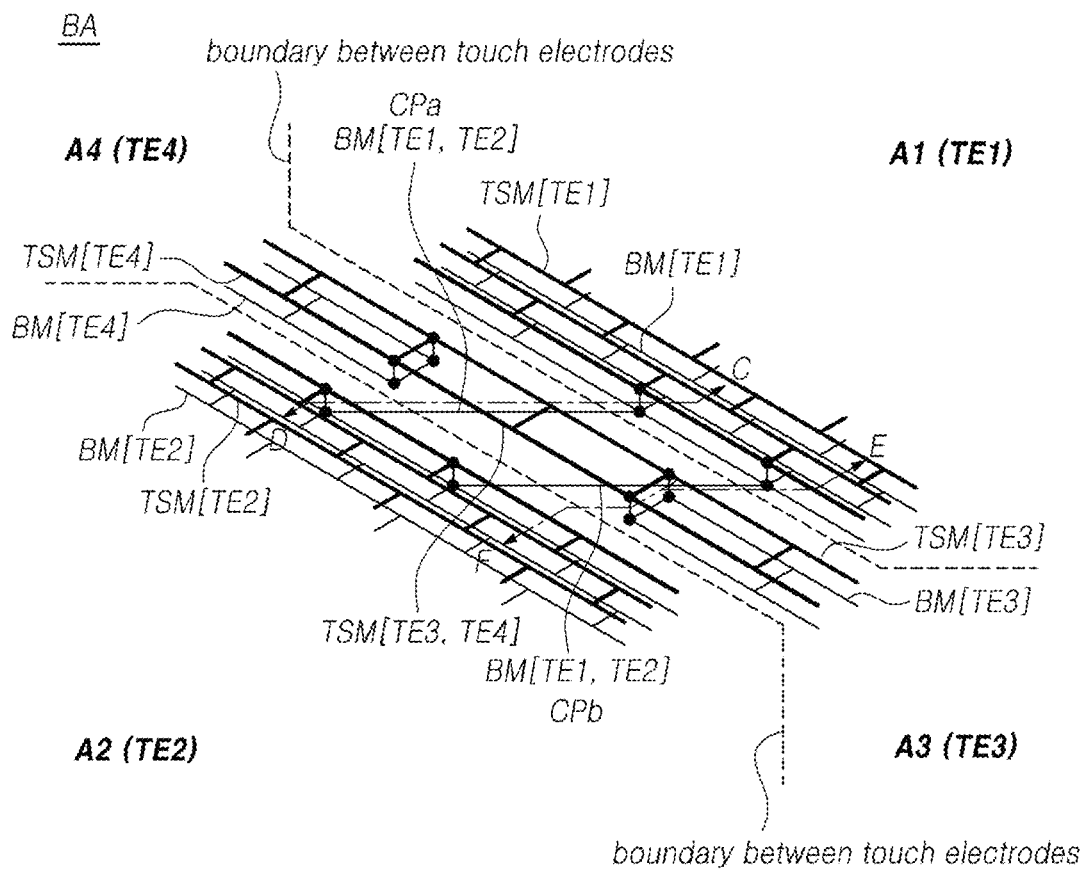
FIG. 10 conceptually illustrates a structure of a resistance reduction type touch sensor of the touch display device according to embodiments of the present disclosure.
Figure 11:
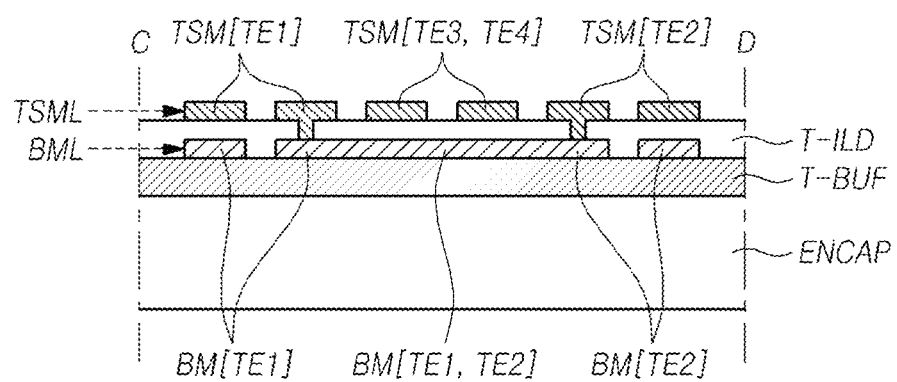
FIG. 11 is a cross-sectional view taken along line C-D in the bridge area of FIG. 10.
Figure 12:
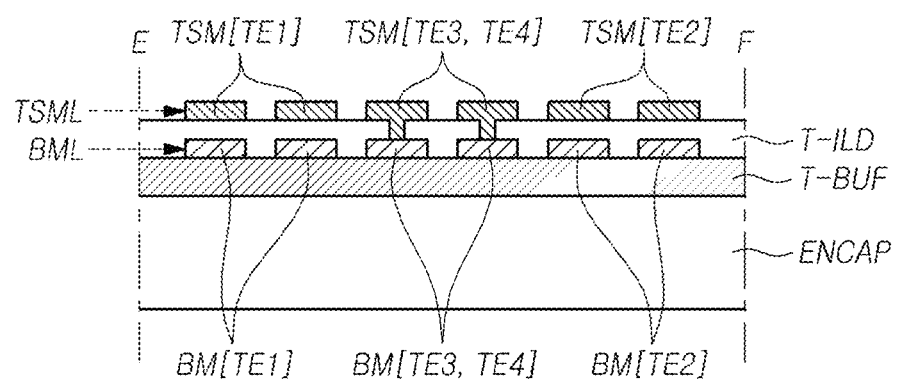
FIG. 12 is a cross-sectional view taken along line E-F in the bridge area of FIG. 10.

FIG. 10 conceptually illustrates a structure of the resistance reduction type touch sensor of the touch display device 100 according to embodiments of the present disclosure. FIG. 11 is a cross-sectional view taken along line C-D in a bridge area BA of FIG. 10. FIG. 12 is a cross-sectional view taken along line E-F in the bridge area BA of FIG. 10. In the description below, reference may also be made to FIGS. 5, 6, and 7 together.

Referring to FIG. 10, the first touch electrode line TEL1 may include a first touch electrode TE1 and a second touch electrode TE2. The first touch electrode line TEL1 may further include a first connection pattern CPa electrically connecting the first touch electrode TE1 and the second touch electrode TE2. The second touch electrode line TEL2 may include a third touch electrode TE3 and a fourth touch electrode TE4. The third touch electrode TE3 and the fourth touch electrode TE4 may be integrally formed (connected).

The first touch electrode line TEL1 may be a transmission touch electrode line TX_TEL, and the second touch electrode line TEL2 may be a reception touch electrode line RX_TEL. Accordingly, the first touch electrode TE1 and the second touch electrode TE2 may be a transmission touch electrodes TX_TE, and the third touch electrode TE3 and the fourth touch electrode TE4 may be a reception touch electrodes RX_TE.

Conversely, the second touch electrode line TEL2 may be the transmission touch electrode line TX_TEL, and the first touch electrode line TEL1 may be the reception touch electrode line RX_TEL. Accordingly, the third touch electrode TE3 and the fourth touch electrode TE4 may be the transmission touch electrodes TX_TE, and the first touch electrode TE1 and the second touch electrode TE2 may be the reception touch electrodes RX_TE.

Referring to FIG. 10, the first touch electrode TE1 may be located in the first area A1, the second touch electrode TE2 may be located in the second area A2, the third touch electrode TE3 may be located in the third area A3, and the fourth touch electrode TE4 may be located in the fourth area A4.

The first connection pattern CPa may electrically connect the first touch electrode TE1 and the second touch electrode TE2. The first touch electrode TE1 and the second touch electrode TE2 may be electrically connected not only through the first connection pattern CPa but also through the second connection pattern CPb. When the first touch electrode TE1 and the second touch electrode TE2 are electrically connected by the first connection pattern CPa and the second connection pattern CPb, the electrical connection between the first touch electrode TE1 and the second touch electrode TE2 may be further stabilized.

The connection portion TSM[TE3, TE4] between the third touch electrode TE3 and the fourth touch electrode TE4 may pass through an intermediate area between the first area A1 and the second area A2.

The first connection pattern CPa may pass through an intermediate area between the first area A1 and the second area A2. The first connection pattern CPa may cross the connection portion of TSM[TE3, TE4] between the third touch electrode TE3 and the fourth touch electrode TE4.

Referring to FIGS. 10 to 12, in the resistance reduction type touch sensor structure (reduced resistance type touch sensor structure) of the touch display device according to the embodiments of the present disclosure, the touch electrodes TE1 to TE4 may be configured using two metal layers, and the connection patterns CPa and CPb may be configured by using one of the two metal layers. Here, the two metal layers may include a first metal layer and a second metal layer.

The resistance reduction type touch sensor structure of the touch display device 100 according to embodiments of the present disclosure is a touch sensor structure that enables resistance reduction through the use of two metal layers. The resistance reduction type touch sensor structure of the touch display device 100 according to embodiments of the present disclosure does not reduce resistance by simply increasing the number of metal layers for forming touch electrodes. The resistance reduction type touch sensor structure of the touch display device 100 according to embodiments of the present disclosure has a structure in which two touch electrode lines are electrically separated while crossing, and a structure that utilizes two metal layers that have already been used. The resistance reduction type touch sensor structure of the touch display device 100 according to embodiments of the present disclosure may include an efficient use and design structure for two metal layers that are already in use.

The resistance reduction type touch sensor structure of the touch display device 100 according to embodiments of the present disclosure is unique in that the resistance reduction structure is designed by utilizing the existing touch sensor metal layer TSML and bridge metal layer BML without adding a new metal layer.

In the resistance reduction type touch sensor structure of the touch display device 100 according to embodiments of the present disclosure, each of the first, second, third and fourth touch electrodes TE1 to TE4 may include a first metal layer and a second metal layer. The first metal layer and the second metal layer may be separated by a touch-interlayer insulating layer T-ILD.

In the resistance reduction type touch sensor structure of the touch display device 100 according to embodiments of the present disclosure, the connection portion TSM[TE3, TE4] to which the third touch electrode TE3 and the fourth touch electrode TE4 are connected may cross the first connection pattern CPa. The first connection pattern CPa may be disposed on one of the first metal layer and the second metal layer.

In the resistance reduction type touch sensor structure of the touch display device 100 according to embodiments of the present disclosure, the first metal layer may be a touch sensor metal layer TSML, and the second metal layer may be a bridge metal layer BML. Alternatively, the first metal layer may be a bridge metal layer BML, and the second metal layer may be a touch sensor metal layer TSML.

Hereinafter, the resistance reduction type touch sensor structure of the touch display device 100 according to embodiments of the present disclosure will be described in more detail.

Referring to FIGS. 10 to 12, the first touch electrode TE1 may include a first touch sensor metal electrode TSM[TE1] of the touch sensor metal layer TSML and a first bridge metal electrode BM[TE1] of the bridge metal layer BML. The first touch sensor metal electrode TSM[TE1] may be located in the touch sensor metal layer TSML, and the first bridge metal electrode BM[TE1] may be located in the bridge metal layer BML. Here, the touch-interlayer insulating layer T-ILD may be disposed between the touch sensor metal layer TSML and the bridge metal layer BML.

The second touch electrode TE2 may include a second touch sensor metal electrode TSM[TE2] of the touch sensor metal layer TSML and a second bridge metal electrode BM[TE2] of the bridge metal layer BML. The second touch sensor metal electrode TSM[TE2] may be located in the touch sensor metal layer TSML, and the second bridge metal electrode BM[TE2] may be located in the bridge metal layer BML.

The third touch electrode TE3 may include a third touch sensor metal electrode TSM[TE3] of the touch sensor metal layer TSML and a third bridge metal electrode BM[TE3] of the bridge metal layer BML. The third touch sensor metal electrode TSM[TE3] may be located in the touch sensor metal layer TSML, and the third bridge metal electrode BM[TE3] may be located in the bridge metal layer BML.

The fourth touch electrode TE4 may include a fourth touch sensor metal electrode TSM[TE4] of the touch sensor metal layer TSML and a fourth bridge metal electrode BM[TE4] of the bridge metal layer BML. The fourth touch sensor metal electrode TSM[TE4] may be located in the touch sensor metal layer TSML, and the fourth bridge metal electrode BM[TE4] may be located in the bridge metal layer BML.

The first touch electrode TE1 and the second touch electrode TE2 may be electrically connected through the first connection pattern CPa. That is, the first connection pattern CPa may be a pattern (electrode) electrically connecting the first touch electrode TE1 and the second touch electrode TE2. The first connection pattern CPa may include the first bridge metal connection patterns BM[TE1, TE2] of the bridge metal layer BML.

Referring to FIGS. 10 and 11, the first touch sensor metal electrode TSM[TE1] and the first bridge metal electrode BM[TE1] may be electrically connected through a through hole of the touch-interlayer insulating layer T-ILD. The second touch sensor metal electrode TSM[TE2] and the second bridge metal electrode BM[TE2] may be electrically connected through a through hole of the touch-interlayer insulating layer T-TLD.

Referring to FIGS. 10, the third touch sensor metal electrode TSM[TE3] and the third bridge metal electrode BM[TE3] may be electrically connected through a through hole of the touch interlayer insulating layer T-ILD. The fourth touch sensor metal electrode TSM[TE4] and the fourth bridge metal electrode BM[TE4] may be electrically connected through a through hole of the touch interlayer insulating layer T-ILD.

Referring to FIGS. 10 and 11, the first bridge metal electrode BM[TE1] of the first touch electrode TE1 and the second bridge metal electrode BM[TE2] of the second touch electrode TE2 may be integrally formed with the first bridge metal connection pattern BM[TE1, TE2] included in the first connection pattern CPa.

Alternatively, the first bridge metal electrode BM[TE1] and the second bridge metal electrode BM[TE2] may be electrically connected through the separately formed first bridge metal connection patterns BM[TE1, TE2].

Referring to FIGS. 10 and 12, the touch sensor metal electrode TSM[TE3, TE4], which is a connection part between the third touch electrode TE3 and the fourth touch electrode TE4, may be electrically connected to the second bridge metal connection pattern BM[TE3, TE4]located in the bridge metal layer BML through a through hole of the touch interlayer insulating layers T-ILD.

Referring to FIGS. 10 to 12, in an area where the connection portion TSM[TE3, TE4] between the third touch electrode TE3 and the fourth touch electrode TE4 overlaps the first connection pattern CPa, each of the third touch electrode TE3 and the fourth touch electrode TE4 may be partially formed of only a touch sensor metal located in the touch sensor metal layer TSML.

In other words, referring to FIGS. 10 to 12, in the area where the connection portion TSM[TE3, TE4], where the third touch electrode TE3 and the fourth touch electrode TE4 are connected, overlaps the first connection pattern CPa, the third touch electrode TE3 may include only the third touch sensor metal electrode TSM[TE3] among the third touch sensor metal electrode TSM[TE3] and the third bridge metal electrode BM[TE3], and the fourth touch electrode TE4 may include only the fourth touch sensor metal electrode TSM [TE4] among the fourth touch sensor metal electrode TSM [TE4] and the fourth bridge metal electrode BM[TE4].

Here, the area in which the touch sensor metal electrode TSM[TE3, TE4], which is a connection portion between the third touch electrode TE3 and the fourth touch electrode TE4, overlaps the first connection pattern CPa may be included in the bridge area BA and may be an intermediate area between the first area A1 and the second area A2.

Referring to FIGS. 10 to 12, each of the first, second, third and fourth touch sensor metal electrodes TSM[TE1] to TSM[TE4] may be a mesh-type electrode having two or more openings OA. Each of the first, second, third and fourth bridge metal electrodes BM[TE1] to BM[TE4] may be a mesh-type electrode having two or more openings OA. The first bridge metal connection pattern BM[TE1, TE2] may be a mesh-type pattern having two or more openings OA. The second bridge metal connection pattern BM[TE3, TE4] may be a mesh-type pattern having two or more openings OA.

Each of the two or more openings OA may correspond to the light emitting area of at least one sub-pixel SP.

The resistance reduction type touch sensor structure according to embodiments of the present disclosure may be applied to the vertical structure of the display panel 110 of FIG. 5. Accordingly, the first touch electrode line TEL1 and the second touch electrode line TEL2 may be disposed on the encapsulation layer ENCAP.

According to the vertical structure of the display panel 110 of FIG. 5, in each of the plurality of openings OA of the bank BANK, one light emitting layer EL among the plurality of light emitting layers EL may be disposed on one anode electrode AE among the plurality of anode electrodes AE.

The first, second, third and fourth touch sensor metal electrodes TSM[TE1] to TSM[TE4], the first, second, third and fourth bridge metal electrodes BM[TE1] to BM[TE4], and the first bridge metal connection pattern BM[TE1, TE2] included in the resistance reduction type touch sensor structure according to the embodiments of the present disclosure may overlap the bank BANK.

The first touch electrode line TEL1 may be a transmission touch electrode line TX_TEL to which a touch driving signal having a variable voltage level is applied, and the second touch electrode line TEL2 may be a reception touch electrode line RX_TEL that forms a capacitance with the first touch electrode line TEL1.

Conversely, the second touch electrode line TEL2 may be a transmission touch electrode line TX_TEL to which a touch driving signal having a variable voltage level is applied, and the first touch electrode line TEL1 may be a reception touch electrode line RX_TEL that forms a capacitance with the second touch electrode line TEL2.

Referring to FIG. 6, the touch display device 100 having the resistance reduction type touch sensor structure according to embodiments of the present disclosure may include a touch pad unit 211 disposed outside the substrate SUB and including a first touch pad TP1 and a second touch pad TP2, a first touch routing line TL1 electrically connecting the first touch electrode line TEL1 and the first touch pad TP1, and a second touch routing line TL2 electrically connecting the second touch electrode line TEL2 and the second touch pad TP2.

Referring to FIG. 5, in the touch display device 100 having the resistance reduction type touch sensor structure according to embodiments of the present disclosure, the encapsulation layer ENCAP may include the inclined surface SLP at the outside (e.g., at an outer region thereof).

Referring to FIG. 5, in the touch display device 100 having the resistance reduction type touch sensor structure according to embodiments of the present disclosure, the first touch routing line TL1 may be disposed along the inclined surface SLP of the encapsulation layer ENCAP to be electrically connected to the first touch pad TP1, and the second touch routing line TL2 may be disposed along the inclined surface SLP of the encapsulation layer ENCAP to be electrically connected to the second touch pad TP2.

When the resistance reduction type touch sensor structure according to the embodiments of the present disclosure is expanded and applied, the first touch routing line TL1 and the second touch routing line TL2 may be double metal lines disposed on the touch sensor metal layer TSML and the bridge metal layer BML.

The display panel 110 of the touch display device 100 having the resistance reduction type touch sensor structure according to embodiments of the present disclosure may further include at least one dam DAM1 and DAM2 disposed between the inclined surface SLP of the encapsulation layer ENCAP and the touch pad unit 211. The first touch routing line TL1 and the second touch routing line TL2 may pass through the upper portion of at least one dam DAM1 and DAM2.

The encapsulation layer ENCAP may include a first inorganic encapsulation layer PAS1, an organic encapsulation layer PCL on the first inorganic encapsulation layer PAS1, and a second inorganic encapsulation layer PAS2 on the organic encapsulation layer PCL. Here, the at least one dam DAM1 and DAM2 may include a portion in which at least one of the first inorganic encapsulation layer PAS1 and the second inorganic encapsulation layer PAS2 extends.

The display panel 110 of the touch display device 100 having the resistance reduction type touch sensor structure according to embodiments of the present disclosure may further include a touch buffer layer T-BUF on the encapsulation layer ENCAP. In this case, the first touch electrode line TEL1 and the second touch electrode line TEL2 may be disposed on the touch buffer layer T-BUF.

The display panel 110 of the touch display device 100 having the resistance reduction type touch sensor structure according to embodiments of the present disclosure may further include a touch protection layer PAC disposed on the first touch electrode line TEL1 and the second touch electrode line TEL2. The touch protection layer PAC may include an organic layer. The touch protection layer PAC may extend to the outside to cover the touch pad unit 211.

The embodiments of the present disclosure described above will be briefly described below.

The touch display device according to embodiments of the present disclosure comprises a substrate, a first touch electrode line on the substrate, and a second touch electrode line crossing the first touch electrode line on the substrate.

In the touch display device according to embodiments of the present disclosure, the first touch electrode line includes a first touch electrode, a second touch electrode, and a first connection pattern electrically connecting the first touch electrode and the second touch electrode. The second touch electrode line includes a third touch electrode and a fourth touch electrode, wherein the third touch electrode and the fourth touch electrode are integrally formed.

In the touch display device according to embodiments of the present disclosure, a portion where the third touch electrode and the fourth touch electrode are connected overlaps the first connection pattern.

The touch display device according to embodiments of the present disclosure may include a touch sensor metal layer and a bridge metal layer, and may further include a touch-interlayer insulating layer disposed between the touch sensor metal layer and the bridge metal layer.

In the touch display device according to embodiments of the present disclosure, the first touch electrode includes a first touch sensor metal electrode in the touch sensor metal layer and a first bridge metal electrode in the bridge metal layer. The second touch electrode includes a second touch sensor metal electrode in the touch sensor metal layer and a second bridge metal electrode in the bridge metal layer. The third touch electrode includes a third touch sensor metal electrode in the touch sensor metal layer and a third bridge metal electrode in the bridge metal layer. The fourth touch electrode includes a fourth touch sensor metal electrode in the touch sensor metal layer and a fourth bridge metal electrode in the bridge metal layer.

In the touch display device according to embodiments of the present disclosure, the first connection pattern includes a first bridge metal connection pattern of the bridge metal layer in which the first, second, third and fourth bridge metal electrodes of the first, second, third and fourth touch electrodes are disposed.

In the touch display device according to embodiments of the present disclosure, the first touch sensor metal electrode and the first bridge metal electrode are electrically connected to each other through at least one first through hole of the touch-interlayer insulating layer, the second touch sensor metal electrode and the second bridge metal electrode are electrically connected to each other through at least one second through hole of the touch-interlayer insulating layer, the third touch sensor metal electrode and the third bridge metal electrode are electrically connected to each other through at least one third through hole of the touch-interlayer insulating layer, and the fourth touch sensor metal electrode and the fourth bridge metal electrode are electrically connected to each other through at least one fourth through hole of the touch-interlayer insulating layer.

In the touch display device according to embodiments of the present disclosure, the first bridge metal electrode and the second bridge metal electrode are integrally formed with the first bridge metal connection pattern.

In the touch display device according to embodiments of the present disclosure, the first bridge metal electrode and the second bridge metal electrode are electrically connected through the first bridge metal connection pattern.

In the touch display device according to embodiments of the present disclosure, in an area where a portion where the third touch electrode and the fourth touch electrode are connected overlaps the first connection pattern, the third touch electrode includes the third touch sensor metal electrode among the third touch sensor metal electrode and the third bridge metal electrode, and the fourth touch electrode includes the fourth touch sensor metal electrode among the fourth touch sensor metal electrode and the fourth bridge metal electrode.

In the touch display device according to embodiments of the present disclosure, the first touch electrode line is a driving touch electrode line (also called a transmission touch electrode line) to which a touch driving signal having a fluctuating voltage level is applied, and the second touch electrode line is a sensing touch electrode line (also called a reception touch electrode line) forming a capacitance with the first touch electrode line.

In the touch display device according to embodiments of the present disclosure, the second touch electrode line is a driving touch electrode line (also called a transmission touch electrode line) to which a touch driving signal having a fluctuating voltage level is applied, and the first touch electrode line is a sensing touch electrode line (also called a reception touch electrode line) forming a capacitance with the second touch electrode line.

In the touch display device according to embodiments of the present disclosure, each of the first, second, third and fourth touch sensor metal electrodes is a mesh-type electrode having two or more openings, and each of the first, second, third and fourth bridge metal electrodes is a mesh-type electrode having two or more openings. The first bridge metal connection pattern is a mesh-type pattern having two or more openings.

In the touch display device according to embodiments of the present disclosure, each of the two or more openings corresponds to a light emitting area of at least one sub-pixel.

The touch display device according to embodiments of the present disclosure further comprises a plurality of anode electrodes disposed on the substrate, a plurality of light emitting layers respectively disposed on the plurality of anode electrodes, a cathode electrode disposed on the plurality of light emitting layers, and an encapsulation layer disposed on the cathode electrode. The first touch electrode line and the second touch electrode line are disposed on the encapsulation layer.

The touch display device according to embodiments of the present disclosure further comprises a bank disposed on the substrate and having a plurality of openings. In each of the plurality of openings, one light emitting layer of the plurality of light emitting layers is disposed on one anode electrode of the plurality of anode electrodes.

In the touch display device according to embodiments of the present disclosure, the first, second, third and fourth touch sensor metal electrodes, the first, second, third and fourth bridge metal electrodes, and the first bridge metal connection pattern overlap the bank.

The touch display device according to embodiments of the present disclosure further comprises a touch pad unit disposed in an outer area of the substrate and including a first touch pad and a second touch pad, a first touch routing line electrically connecting the first touch electrode line and the first touch pad, and a second touch routing line electrically connecting the second touch electrode line and the second touch pad.

In the touch display device according to embodiments of the present disclosure, the encapsulation layer includes an inclined surface, and the inclined surface is located outside the encapsulation layer, the first touch routing line is disposed along the inclined surface of the encapsulation layer and is electrically connected to the first touch pad, the second touch routing line is disposed along the inclined surface of the encapsulation layer and is electrically connected to the second touch pad, and the first touch routing line and the second touch routing line are double metal lines located in the touch sensor metal layer and the bridge metal layer.

The touch display device according to embodiments of the present disclosure further comprises at least one dam disposed between the inclined surface of the encapsulation layer and the touch pad unit. The first touch routing line and the second touch routing line pass over the at least one dam.

In the touch display device according to embodiments of the present disclosure, the encapsulation layer includes a first inorganic encapsulation layer, an organic encapsulation layer on the first inorganic encapsulation layer, and a second inorganic encapsulation layer on the organic encapsulation layer. The at least one dam includes a portion in which at least one of the first inorganic encapsulation layer and the second inorganic encapsulation layer extends.

The touch display device according to embodiments of the present disclosure further comprises a touch buffer layer on the encapsulation layer. The first touch electrode line and the second touch electrode line are disposed on the touch buffer layer.

The touch display device according to embodiments of the present disclosure further comprises an organic layer disposed on the first touch electrode line and the second touch electrode line.

The touch display device according to embodiments of the present disclosure comprises a first touch electrode positioned in a first area, a second touch electrode positioned in a second area, a third touch electrode positioned in a third area, a fourth touch electrode positioned in a fourth area, and a first connection pattern electrically connecting the first touch electrode and the second touch electrode.

In the touch display device according to embodiments of the present disclosure, a connection portion between the third touch electrode and the fourth touch electrode passes through an intermediate area between the first area and the second area. The first connection pattern passes through the intermediate area and crosses the connection portion between the third touch electrode and the fourth touch electrode.

In the touch display device according to embodiments of the present disclosure, each of the first, second, third and fourth touch electrodes includes a first metal layer and a second metal layer, and the first metal layer and the second metal layer are separated by a touch-interlayer insulating layer.

In the touch display device according to embodiments of the present disclosure, the first connection pattern is disposed on one of the first metal layer and the second metal layer.

In the touch display device according to embodiments of the present disclosure, each of the first, second, third and fourth touch electrodes is a mesh-type electrode having two or more openings. Each of the two or more openings has a position corresponding to a light emitting area of at least one sub-pixel.

The display panel according to embodiments of the present disclosure comprises a substrate, a first touch electrode line on the substrate, and a second touch electrode line crossing the first touch electrode line on the substrate.

In the display panel according to embodiments of the present disclosure, the first touch electrode line includes a first touch electrode, a second touch electrode, and a first connection pattern electrically connecting the first touch electrode and the second touch electrode.

In the display panel according to embodiments of the present disclosure, the second touch electrode line includes a third touch electrode and a fourth touch electrode. The third touch electrode and the fourth touch electrode are integrally formed.

In the display panel according to embodiments of the present disclosure, a portion where the third touch electrode and the fourth touch electrode are connected overlaps the first connection pattern.

The display panel according to embodiments of the present disclosure may include a touch sensor metal layer and a bridge metal layer, and may further include a touch-interlayer insulating layer disposed between the touch sensor metal layer and the bridge metal layer.

In the display panel according to embodiments of the present disclosure, the first touch electrode includes a first touch sensor metal electrode in the touch sensor metal layer and a first bridge metal electrode in the bridge metal layer. The second touch electrode includes a second touch sensor metal electrode in the touch sensor metal layer and a second bridge metal electrode in the bridge metal layer. The third touch electrode includes a third touch sensor metal electrode in the touch sensor metal layer and a third bridge metal electrode in the bridge metal layer. The fourth touch electrode includes a fourth touch sensor metal electrode in the touch sensor metal layer and a fourth bridge metal electrode in the bridge metal layer.

In the display panel according to embodiments of the present disclosure, the first connection pattern includes a first bridge metal connection pattern of the bridge metal layer in which the first, second, third and fourth bridge metal electrodes of the first, second, third and fourth touch electrodes are disposed.

According to embodiments of the present disclosure, it is possible to provide a touch display device and a display panel having a resistance reduction type touch sensor structure that can provide high touch sensitivity and reduce the resistance of the touch electrode without increasing the thickness of the touch sensor as compared to the conventional one.

According to embodiments of the present disclosure, it is possible to provide a touch display device and a display panel having a resistance reduction type touch sensor structure capable of reducing the resistance of a touch electrode by using the existing metal layers without adding a new metal layer in the display panel.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of should be construed based on the following claims, and all technical ideas within the scope of equivalents should be construed as being included within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus comprising:
a substrate;
a first touch electrode line formed in a touch sensor metal layer on the substrate, the first touch electrode line having a first touch electrode and a second touch electrode; and
a second touch electrode line formed in the touch sensor metal layer, the second touch electrode line having a third touch electrode and a fourth touch electrode, wherein the third touch electrode and the fourth touch electrode are integrally formed and coupled to each other at a touch sensor connection portion in the touch sensor metal layer,
a bridge metal layer having a first bridge metal connection pattern electrically connecting the first touch electrode and the second touch electrode;
a touch-interlayer insulating layer disposed between the touch sensor metal layer and the bridge metal layer,
wherein the touch sensor connection portion where the third touch electrode and the fourth touch electrode connect overlaps and is aligned with the first bridge metal connection pattern,
a first bridge metal electrode extending from the first touch electrode in the touch sensor metal layer to the bridge metal layer; and
a second bridge metal electrode extending from the second touch electrode in the touch sensor metal layer to the bridge metal layer,
wherein the first touch electrode has a two-layer structure comprising the touch sensor metal layer forming a first touch sensor metal electrode and the bridge metal layer forming the first bridge metal electrode,
wherein the second touch electrode has a two-layer structure comprising the touch sensor metal layer forming a second touch sensor metal electrode and the bridge metal layer forming the second bridge metal electrode.

2. The display apparatus of claim 1, wherein the touch sensor connection portion is a first mesh comprised of a plurality of metal lines and the bridge metal layer is a second mesh comprised of a plurality of metal lines; and
wherein the metal lines of the first mesh are positioned overlapping and aligned with the metal lines of the second mesh.

3. The display apparatus of claim 1, wherein the first touch electrode includes a first touch sensor metal electrode of the touch sensor metal layer,
wherein the second touch electrode includes a second touch sensor metal electrode of the touch sensor metal layer,
wherein the third touch electrode includes a third touch sensor metal electrode of the touch sensor metal layer and a third bridge metal electrode of the bridge metal layer,
wherein the fourth touch electrode includes a fourth touch sensor metal electrode of the touch sensor metal layer and a fourth bridge metal electrode of the bridge metal layer,
wherein the first touch sensor metal electrode and the first bridge metal electrode are electrically connected through at least one first through hole of the touch-interlayer insulating layer,
wherein the second touch sensor metal electrode and the second bridge metal electrode are electrically connected through at least one second through hole of the touch-interlayer insulating layer,
wherein the third touch sensor metal electrode and the third bridge metal electrode are electrically connected through at least one third through hole of the touch-interlayer insulating layer, and
wherein the fourth touch sensor metal electrode and the fourth bridge metal electrode are electrically connected through at least one fourth through hole of the touch-interlayer insulating layer.

4. The display apparatus of claim 1, wherein the first bridge metal electrode and the second bridge metal electrode are integrally formed with the first bridge metal connection pattern.

5. The display apparatus of claim 1, wherein the first bridge metal electrode and the second bridge metal electrode are electrically connected through the first bridge metal connection pattern.

6. The display apparatus of claim 1, wherein in an area where a portion of the third touch electrode and the fourth touch electrode are connected at a location that overlaps the first bridge metal connection pattern,
the third touch electrode includes the third touch sensor metal electrode among the third touch sensor metal electrode and the third bridge metal electrode, and
the fourth touch electrode includes the fourth touch sensor metal electrode among the fourth touch sensor metal electrode and the fourth bridge metal electrode.

7. The display apparatus of claim 1, wherein the first touch electrode line comprises a driving touch electrode line to which a touch driving signal including a fluctuating voltage level is applied, and the second touch electrode line comprises a sensing touch electrode line forming a capacitance with the first touch electrode line.

8. The display apparatus of claim 1, wherein the second touch electrode line comprises a driving touch electrode line to which a touch driving signal including a fluctuating voltage level is applied, and the first touch electrode line comprises a sensing touch electrode line forming a capacitance with the second touch electrode line.

9. The display apparatus of claim 1, wherein each of the first, second, third and fourth touch sensor metal electrodes comprises a first mesh-type electrode including two or more first openings, and each of the first, second, third and fourth bridge metal electrodes comprises a second mesh-type electrode including two or more second openings, and
wherein the first bridge metal connection pattern comprises a third mesh-type pattern including two or more third openings.

10. The display apparatus of claim 9, wherein each of the two or more first, second, and third openings corresponds to a light emitting area of at least one sub-pixel.

11. The display apparatus of claim 1, further comprising:
a plurality of anode electrodes disposed on the substrate;
a plurality of light emitting layers respectively disposed on the plurality of anode electrodes;
a cathode electrode disposed on the plurality of light emitting layers; and
an encapsulation layer disposed on the cathode electrode,
wherein the first touch electrode line and the second touch electrode line are disposed on the encapsulation layer.

12. The display apparatus of claim 11, further comprising a bank disposed on the substrate and having a plurality of openings,
wherein in each of the plurality of openings, one light emitting layer of the plurality of light emitting layers is disposed on one anode electrode of the plurality of anode electrodes, and wherein the first, second, third and fourth touch sensor metal electrodes, the first, second, third and fourth bridge metal electrodes, and the first bridge metal connection pattern overlap the bank.

13. The display apparatus of claim 11, further comprising:
a touch pad unit disposed in an outer area of the substrate and including a first touch pad and a second touch pad;
a first touch routing line electrically connecting the first touch electrode line and the first touch pad; and
a second touch routing line electrically connecting the second touch electrode line and the second touch pad,
wherein the encapsulation layer includes an inclined surface, and the inclined surface is located at an outer region of the encapsulation layer,
the first touch routing line is disposed along the inclined surface of the encapsulation layer and is electrically connected to the first touch pad,
the second touch routing line is disposed along the inclined surface of the encapsulation layer and is electrically connected to the second touch pad, and
the first touch routing line and the second touch routing line are double metal lines located in the touch sensor metal layer and the bridge metal layer.

14. The display apparatus of claim 13, further comprising at least one dam disposed between the inclined surface of the encapsulation layer and the touch pad unit,
wherein the first touch routing line and the second touch routing line pass over the at least one dam.

15. The display apparatus of claim 14, wherein the encapsulation layer includes a first inorganic encapsulation layer, an organic encapsulation layer on the first inorganic encapsulation layer, and a second inorganic encapsulation layer on the organic encapsulation layer, and
wherein the at least one dam includes a portion in which at least one of the first inorganic encapsulation layer and the second inorganic encapsulation layer extends.

16. The display apparatus of claim 11, further comprising a touch buffer layer on the encapsulation layer, the first touch electrode line and the second touch electrode line being disposed on the touch buffer layer.

17. The display apparatus of claim 1, further comprising an organic layer disposed on the first touch electrode line and the second touch electrode line.

18. The display apparatus of claim 1, wherein the third touch electrode includes a third touch sensor metal electrode in the touch sensor metal layer and a third bridge metal electrode in the bridge metal layer,
wherein the fourth touch electrode includes a fourth touch sensor metal electrode in the touch sensor metal layer and a fourth bridge metal electrode in the bridge metal layer.

19. A display panel comprising:
a substrate;
a transistor on the substrate;
a light emitting device electrically connected to the transistor;
an encapsulation layer on the light emitting device; and
a first touch electrode, a second touch electrode, a third touch electrode, and a fourth touch electrode disposed in a first metal layer on the encapsulation layer, each of the first, second, third and fourth touch electrode being respectfully comprised of a mesh having a plurality of metal lines that intersect each other within each electrode;
an electrical connection member between the first touch electrode and the second touch electrode positioned in the first metal layer;
an electrical connection bridge between the third touch electrode and the fourth touch electrode positioned in a second metal layer different from the first metal layer, the electrical connection bridge being comprised of a plurality of metal lines that are positioned to aligned with a plurality of the metal lines that comprise the mesh of the first and second touch electrodes; and
an insulating layer between the first and second metal layers.

20. The display panel of claim 19, wherein the plurality of metal lines of the electrical connection bridge extend parallel to a first set of metal lines of the mesh of the first touch electrode for a first distance and perpendicular to the first set of metal lines of the first touch electrode for a second distance.

21. The display panel of claim 20, wherein a first portion of the plurality of metal lines of the electrical connection bridge are perpendicular to a second portion of the plurality of metal lines of the connection bridge, the first and second portions forming a right angle at their intersection.

* * * * *